(12) United States Patent
Laughlin et al.

(10) Patent No.: US 10,504,159 B2
(45) Date of Patent: Dec. 10, 2019

(54) WHOLESALE/TRADE-IN PRICING SYSTEM, METHOD AND COMPUTER PROGRAM PRODUCT THEREFOR

(71) Applicant: TrueCar, Inc., Santa Monica, CA (US)

(72) Inventors: Isaac Lemon Laughlin, Los Angeles, CA (US); Xingchu Liu, Austin, TX (US); Mikhail Semeniuk, Golden Valley, MN (US); Michael D. Swinson, Santa Monica, CA (US)

(73) Assignee: TrueCar, Inc., Santa Monica, CA (US)

( * ) Notice: Subject to any disclaimer, the term of this patent is extended or adjusted under 35 U.S.C. 154(b) by 760 days.

(21) Appl. No.: 14/031,930

(22) Filed: Sep. 19, 2013

(65) Prior Publication Data

US 2014/0214696 A1    Jul. 31, 2014

Related U.S. Application Data

(60) Provisional application No. 61/758,017, filed on Jan. 29, 2013.

(51) Int. Cl.
*G06Q 30/02* (2012.01)
*G06Q 10/00* (2012.01)
(Continued)

(52) U.S. Cl.
CPC ................................ *G06Q 30/0278* (2013.01)

(58) Field of Classification Search
USPC ......................................... 705/306, 7.35, 400
See application file for complete search history.

(56) References Cited

U.S. PATENT DOCUMENTS

| 5,361,201 A | 11/1994 | Jost |
| 5,377,095 A | 12/1994 | Maeda et al. |

(Continued)

FOREIGN PATENT DOCUMENTS

| CN | 1501301 A | 6/2004 |
| CN | 1734492 A | 2/2006 |

(Continued)

OTHER PUBLICATIONS

Youngs ("Three Values Associated with Used-Vehicle Pricing," J.D. Power. Feb. 24, 2012. http://www.jdpower.com/cars/articles/tips-advice/three-values-associated-used-vehicle-pricing.).*

(Continued)

*Primary Examiner* — Amanda C Abrahamson
*Assistant Examiner* — Johnathan J Lindsey, III
(74) *Attorney, Agent, or Firm* — Sprinkle IP Law Group

(57) ABSTRACT

Systems, methods and computer program products that determine wholesale prices for durable goods such as used vehicles. In one embodiment, a system includes a computer processor, a network interface, a data storage device, and an output device. The system collects and stores, via the network interface, historical sales information from external data sources. A retail price for a target vehicle is determined based on the collected information. Condition information for the vehicle is collected and used to adjust the retail price to arrive at a wholesale price, which is output to a user. The system may also adjust the price based on repair costs associated with identified vehicle conditions. The system may collect cost information associated with a wholesale sale transaction and deduct these costs and a profit margin from the wholesale price to produce a trade-in price.

17 Claims, 6 Drawing Sheets

(51) Int. Cl.
*G06F 17/00* (2019.01)
*G06G 7/00* (2006.01)

(56) References Cited

U.S. PATENT DOCUMENTS

| | | |
|---|---|---|
| 5,774,873 A | 6/1998 | Berent et al. |
| 6,006,201 A | 12/1999 | Berent et al. |
| 6,029,141 A | 2/2000 | Bezos et al. |
| 6,125,356 A | 9/2000 | Brockman et al. |
| 6,282,517 B1 | 8/2001 | Wolfe et al. |
| 6,298,328 B1 | 10/2001 | Healy et al. |
| 6,330,499 B1 | 12/2001 | Chou et al. |
| 6,604,083 B1 | 8/2003 | Bailey |
| 6,609,108 B1 | 8/2003 | Pulliam et al. |
| 6,882,983 B2 | 4/2005 | Furphy et al. |
| 6,892,185 B1 | 5/2005 | Van Etten et al. |
| 6,975,999 B2 | 12/2005 | Moore |
| 7,050,982 B2 | 5/2006 | Sheinson |
| 7,113,090 B1 | 9/2006 | Saylor |
| 7,133,835 B1 | 11/2006 | Fusz et al. |
| 7,184,974 B2 | 2/2007 | Shishido |
| 7,219,080 B1 | 5/2007 | Wagoner et al. |
| 7,287,000 B2 | 10/2007 | Boyd et al. |
| 7,366,679 B2 | 4/2008 | Yuyama et al. |
| 7,392,224 B1 | 6/2008 | Bauer et al. |
| 7,546,243 B2 | 6/2009 | Kapadia et al. |
| 7,596,501 B2 | 9/2009 | Tivey et al. |
| 7,596,512 B1 * | 9/2009 | Raines ............... G06Q 30/02 705/26.4 |
| 7,599,842 B2 | 10/2009 | Tivey et al. |
| 7,624,065 B2 | 11/2009 | Schoen et al. |
| 7,747,474 B2 | 6/2010 | Miloslavsky et al. |
| 7,778,841 B1 * | 8/2010 | Bayer ............... G06Q 10/00 705/29 |
| 7,801,798 B1 | 9/2010 | Huemer et al. |
| 1,946,607 A1 | 10/2010 | Hygema et al. |
| 7,818,201 B2 | 10/2010 | Shevlin et al. |
| 7,835,982 B2 | 11/2010 | Schoen et al. |
| 7,921,052 B2 | 4/2011 | Dabney et al. |
| 7,945,483 B2 | 5/2011 | Inghelbrecht et al. |
| 7,970,713 B1 | 6/2011 | Gorelik et al. |
| 8,000,989 B1 | 8/2011 | Kiefhaber et al. |
| 8,005,684 B1 * | 8/2011 | Cheng ............... G06Q 10/06 705/1.1 |
| 8,036,952 B2 | 10/2011 | Mohr et al. |
| 8,078,515 B2 | 12/2011 | John |
| 8,095,422 B2 | 1/2012 | Hallowell et al. |
| 8,108,262 B1 | 1/2012 | Thirumalai et al. |
| 8,112,325 B2 | 2/2012 | Foy et al. |
| 8,126,881 B1 | 2/2012 | Sethi et al. |
| 8,219,464 B2 | 7/2012 | Inghelbrecht et al. |
| 8,230,362 B2 | 7/2012 | Couch |
| 8,255,270 B2 | 8/2012 | Rose et al. |
| 8,326,845 B2 | 12/2012 | Sethi et al. |
| 8,375,037 B2 | 2/2013 | Sethi et al. |
| 8,392,264 B2 * | 3/2013 | Doll ............... G06Q 30/02 705/26.1 |
| 8,429,220 B2 | 4/2013 | Wilkinson et al. |
| 8,515,817 B2 | 8/2013 | Noy et al. |
| 8,521,615 B2 | 8/2013 | Inghelbrecht et al. |
| 8,521,619 B2 | 8/2013 | Perry, III et al. |
| 8,538,828 B2 | 9/2013 | Skutta |
| 8,589,212 B2 | 11/2013 | Pollak et al. |
| 8,595,082 B2 | 11/2013 | Skutta |
| 8,612,314 B2 | 12/2013 | Swinson |
| 8,645,193 B2 | 2/2014 | Swinson et al. |
| 8,676,799 B1 | 3/2014 | Vaver |
| 8,818,881 B2 | 8/2014 | Himmerick et al. |
| 8,868,572 B2 | 10/2014 | Sethi et al. |
| 9,020,843 B2 | 4/2015 | Taira et al. |
| 9,020,844 B2 | 4/2015 | Taira et al. |
| 9,103,743 B2 | 8/2015 | Couch |
| 9,104,718 B1 | 8/2015 | Levy et al. |
| 9,111,308 B2 | 8/2015 | Taira et al. |
| 9,129,325 B2 | 9/2015 | Taira et al. |
| 9,189,960 B2 | 11/2015 | Couch et al. |
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| D774,523 S | 12/2016 | Agee |
| D774,524 S | 12/2016 | Agee |
| 9,600,822 B2 | 3/2017 | Pyle et al. |
| 9,727,904 B2 | 8/2017 | Inghelbrecht et al. |
| 9,754,304 B2 | 9/2017 | Taira et al. |
| 9,767,491 B2 | 9/2017 | Swinson et al. |
| 9,818,140 B2 | 11/2017 | Inghelbrecht et al. |
| 9,904,933 B2 | 2/2018 | Taira et al. |
| 9,904,948 B2 | 2/2018 | Taira et al. |
| 10,108,989 B2 | 10/2018 | Swinson et al. |
| 1,021,712 A1 | 2/2019 | Taira et al. |
| 10,262,344 B2 | 4/2019 | Swinson et al. |
| 10,269,030 B2 | 4/2019 | Taira et al. |
| 10,269,031 B2 | 4/2019 | Inghelbrecht et al. |
| 10,296,939 B2 | 5/2019 | Swinson et al. |
| 2001/0037205 A1 | 11/2001 | Joao |
| 2001/0037265 A1 | 11/2001 | Kleinberg |
| 2002/0007331 A1 | 1/2002 | Lo et al. |
| 2002/0111856 A1 | 8/2002 | Messer et al. |
| 2002/0116348 A1 | 8/2002 | Phillips et al. |
| 2002/0147625 A1 | 10/2002 | Kolke, Jr. |
| 2002/0194051 A1 | 12/2002 | Hall et al. |
| 2003/0028437 A1 | 2/2003 | Grant et al. |
| 2003/0065532 A1 | 4/2003 | Takaoka |
| 2003/0083961 A1 | 5/2003 | Bezos et al. |
| 2003/0105728 A1 * | 6/2003 | Yano ............... G06Q 10/06 705/400 |
| 2003/0130966 A1 * | 7/2003 | Thompson ............ G06Q 99/00 705/500 |
| 2003/0200151 A1 | 10/2003 | Ellenson et al. |
| 2003/0220773 A1 | 11/2003 | Haas et al. |
| 2003/0229577 A1 | 12/2003 | Nabel |
| 2004/0014454 A1 | 1/2004 | Burgess |
| 2004/0019516 A1 | 1/2004 | Puskorius et al. |
| 2004/0093284 A1 | 5/2004 | Takaoka |
| 2004/0128224 A1 | 7/2004 | Dabney et al. |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0172266 A1 | 9/2004 | Sheinson et al. |
| 2004/0210485 A1 | 10/2004 | Luo et al. |
| 2004/0254808 A1 | 12/2004 | Bennett et al. |
| 2005/0071249 A1 | 3/2005 | Nix et al. |
| 2005/0086070 A1 * | 4/2005 | Engelman ............ G06Q 10/087 705/28 |
| 2005/0108112 A1 | 5/2005 | Ellenson et al. |
| 2005/0125308 A1 | 6/2005 | Puentes et al. |
| 2005/0144061 A1 | 6/2005 | Rarity et al. |
| 2005/0171859 A1 | 8/2005 | Harrington et al. |
| 2005/0171896 A1 * | 8/2005 | Seretti ............... G06Q 30/06 705/37 |
| 2005/0197941 A1 | 9/2005 | Veit |
| 2005/0209934 A1 | 9/2005 | Irby et al. |
| 2005/0256778 A1 | 11/2005 | Boyd et al. |
| 2005/0256780 A1 | 11/2005 | Eldred |
| 2005/0261951 A1 | 11/2005 | Tighe |
| 2005/0266833 A1 | 12/2005 | Walker |
| 2005/0267774 A1 * | 12/2005 | Merritt ............... G06Q 10/0637 705/306 |
| 2006/0080210 A1 | 4/2006 | Mourad et al. |
| 2006/0085209 A1 | 4/2006 | Walker, III |
| 2006/0085283 A1 | 4/2006 | Griffiths |
| 2006/0106668 A1 | 5/2006 | Kim et al. |
| 2006/0129423 A1 | 6/2006 | Sheinson et al. |
| 2006/0178973 A1 * | 8/2006 | Chiovari ............... G06Q 10/00 705/35 |
| 2006/0212355 A1 | 9/2006 | Teague et al. |
| 2006/0242089 A1 * | 10/2006 | Vahidi ............... G06Q 10/10 705/400 |
| 2007/0005446 A1 | 1/2007 | Fusz et al. |
| 2007/0038522 A1 | 2/2007 | Bell et al. |
| 2007/0112582 A1 | 5/2007 | Fenlon |
| 2007/0124284 A1 | 5/2007 | Lin et al. |

(56) References Cited

U.S. PATENT DOCUMENTS

| | | | |
|---|---|---|---|
| 2007/0143132 A1 | 6/2007 | Linne et al. | |
| 2007/0143195 A1* | 6/2007 | Bell | G06Q 30/06 705/35 |
| 2007/0162293 A1* | 7/2007 | Malkon | G06Q 99/00 705/306 |
| 2007/0185777 A1 | 8/2007 | Pyle et al. | |
| 2007/0219851 A1 | 9/2007 | Taddei et al. | |
| 2007/0244797 A1 | 10/2007 | Hinson et al. | |
| 2007/0250327 A1* | 10/2007 | Hedy | G06Q 30/00 705/306 |
| 2008/0027882 A1* | 1/2008 | Allen | G06Q 30/02 705/400 |
| 2008/0046383 A1* | 2/2008 | Hirtenstein | G06Q 30/0278 705/400 |
| 2008/0052216 A1 | 2/2008 | Johnson et al. | |
| 2008/0077477 A1* | 3/2008 | McElhiney | G06Q 30/0201 705/7.35 |
| 2008/0177590 A1 | 7/2008 | Brodsky et al. | |
| 2008/0189156 A1 | 8/2008 | Voda et al. | |
| 2008/0201163 A1 | 8/2008 | Barker et al. | |
| 2008/0201203 A1 | 8/2008 | Rose et al. | |
| 2008/0207191 A1 | 8/2008 | Fleenor et al. | |
| 2008/0288312 A1 | 11/2008 | Miles et al. | |
| 2008/0288361 A1 | 11/2008 | Rego et al. | |
| 2008/0300962 A1 | 12/2008 | Cawston et al. | |
| 2009/0006118 A1* | 1/2009 | Pollak | G06Q 30/02 705/306 |
| 2009/0037356 A1 | 2/2009 | Rothstein et al. | |
| 2009/0048859 A1 | 2/2009 | McCarthy et al. | |
| 2009/0157522 A1* | 6/2009 | Srinivasan | G06Q 30/00 705/26.1 |
| 2009/0171761 A1 | 7/2009 | Noy et al. | |
| 2009/0187513 A1* | 7/2009 | Noy | G06Q 30/02 705/400 |
| 2010/0070343 A1 | 3/2010 | Taira et al. | |
| 2010/0070344 A1* | 3/2010 | Taira | G06Q 10/067 705/400 |
| 2010/0070382 A1 | 3/2010 | Inghelbrecht et al. | |
| 2010/0088158 A1* | 4/2010 | Pollack | G06Q 30/02 705/7.35 |
| 2010/0161376 A1 | 6/2010 | Spagnolo | |
| 2010/0161408 A1 | 6/2010 | Karson et al. | |
| 2010/0179861 A1 | 7/2010 | Teerilahti et al. | |
| 2010/0191659 A1* | 7/2010 | Hebron | G06Q 30/06 705/306 |
| 2010/0198735 A1* | 8/2010 | Basak | G06Q 30/0278 705/306 |
| 2010/0274571 A1 | 10/2010 | McFall et al. | |
| 2010/0274631 A1 | 10/2010 | McFall et al. | |
| 2011/0022525 A1* | 1/2011 | Swinson | G06Q 30/02 705/306 |
| 2011/0040697 A1 | 2/2011 | Constantinou et al. | |
| 2011/0082720 A1* | 4/2011 | Swinson | G06Q 10/10 705/7.35 |
| 2011/0082759 A1* | 4/2011 | Swinson | G06Q 30/02 705/26.1 |
| 2011/0082804 A1* | 4/2011 | Swinson | G06Q 30/02 705/306 |
| 2011/0131652 A1 | 6/2011 | Robinson et al. | |
| 2011/0173227 A1 | 7/2011 | Klein | |
| 2011/0202471 A1* | 8/2011 | Scott | G06Q 30/0278 705/306 |
| 2011/0264595 A1* | 10/2011 | Anspach | G06Q 30/02 705/306 |
| 2012/0005070 A1 | 1/2012 | McFall et al. | |
| 2012/0005108 A1 | 1/2012 | Hollenshead et al. | |
| 2012/0197699 A1* | 8/2012 | Snell | G06Q 30/08 705/14.11 |
| 2012/0233014 A1 | 9/2012 | Banks et al. | |
| 2012/0259728 A1 | 10/2012 | Inghelbrecht et al. | |
| 2012/0284087 A1 | 11/2012 | Pollak | |
| 2012/0284113 A1 | 11/2012 | Pollak | |
| 2012/0316997 A1* | 12/2012 | Herbert | G06Q 30/06 705/27.1 |
| 2012/0330723 A1* | 12/2012 | Hedy | G06Q 30/00 705/7.34 |
| 2013/0006876 A1* | 1/2013 | Swinson | G06Q 30/02 705/306 |
| 2013/0018752 A1* | 1/2013 | Foster | G06Q 30/08 705/26.3 |
| 2013/0030870 A1* | 1/2013 | Swinson | G06Q 10/06 705/7.35 |
| 2013/0103457 A1 | 4/2013 | Marshall et al. | |
| 2013/0117067 A1* | 5/2013 | Sullivan | G06Q 30/0202 705/7.29 |
| 2013/0191247 A1 | 7/2013 | Huang et al. | |
| 2013/0304571 A1* | 11/2013 | Swinson | G06Q 30/0277 705/14.46 |
| 2013/0311319 A1 | 11/2013 | Noy et al. | |
| 2013/0311341 A1 | 11/2013 | Noy et al. | |
| 2013/0339173 A1 | 12/2013 | Skutta | |
| 2014/0032352 A1 | 1/2014 | Fraser et al. | |
| 2014/0032353 A1 | 1/2014 | Fraser et al. | |
| 2014/0058957 A1 | 2/2014 | Swinson et al. | |
| 2014/0067615 A1 | 3/2014 | Park et al. | |
| 2014/0074553 A1 | 3/2014 | Sullivan et al. | |
| 2014/0089208 A1 | 3/2014 | Humble et al. | |
| 2014/0114726 A1 | 4/2014 | Swinson et al. | |
| 2014/0149183 A1* | 5/2014 | Liu | G06Q 30/0206 705/7.35 |
| 2014/0214491 A1* | 7/2014 | Semeniuk | G06Q 30/0283 705/7.35 |
| 2014/0214696 A1 | 7/2014 | Laughlin et al. | |
| 2014/0229240 A1* | 8/2014 | Taira | G06Q 10/067 705/7.35 |
| 2014/0229241 A1 | 8/2014 | Taira et al. | |
| 2014/0229391 A1 | 8/2014 | East, III et al. | |
| 2014/0237410 A1 | 8/2014 | Klein | |
| 2014/0244424 A1* | 8/2014 | Swinson | G06Q 30/0283 705/26.5 |
| 2014/0257934 A1 | 9/2014 | Chrzan et al. | |
| 2014/0258044 A1 | 9/2014 | Chrzan et al. | |
| 2014/0278806 A1 | 9/2014 | Duguid et al. | |
| 2014/0279020 A1 | 9/2014 | Duguid et al. | |
| 2014/0279171 A1 | 9/2014 | Burgiss et al. | |
| 2014/0279229 A1 | 9/2014 | Burgiss et al. | |
| 2014/0279263 A1* | 9/2014 | Liu | G06Q 30/0627 705/26.63 |
| 2014/0279275 A1 | 9/2014 | Burgiss et al. | |
| 2014/0279709 A1* | 9/2014 | Lander | G06Q 10/08 705/400 |
| 2014/0351074 A1 | 11/2014 | Enge et al. | |
| 2014/0358719 A1 | 12/2014 | Inghelbrecht et al. | |
| 2015/0058152 A1 | 2/2015 | Pollak et al. | |
| 2015/0134422 A1* | 5/2015 | Swinson | G06Q 30/0206 705/7.35 |
| 2015/0193800 A1 | 7/2015 | Taira et al. | |
| 2015/0206162 A1 | 7/2015 | Taira et al. | |
| 2015/0206206 A1 | 7/2015 | Puente et al. | |
| 2015/0220876 A1 | 8/2015 | Sethi et al. | |
| 2015/0242926 A1* | 8/2015 | Taira | G06Q 30/0627 705/26.63 |
| 2015/0310466 A1* | 10/2015 | LaCivita | G06Q 10/087 705/7.34 |
| 2015/0324737 A1 | 11/2015 | Chrzan et al. | |
| 2015/0324879 A1 | 11/2015 | Lu et al. | |
| 2015/0356672 A1 | 12/2015 | Humble et al. | |
| 2015/0363838 A1* | 12/2015 | Wu | G06Q 30/0278 705/306 |
| 2015/0363865 A1* | 12/2015 | Ramanuja | G06Q 30/0631 705/26.62 |
| 2016/0343058 A1 | 11/2016 | Levy et al. | |
| 2016/0371323 A1 | 12/2016 | Garcia, III et al. | |
| 2017/0109768 A1 | 4/2017 | Swinson et al. | |
| 2017/0109769 A1 | 4/2017 | Inghelbrecht et al. | |
| 2017/0109799 A1 | 4/2017 | Swinson et al. | |
| 2017/0109833 A1 | 4/2017 | Taira et al. | |
| 2017/0286983 A1 | 10/2017 | Taira et al. | |
| 2017/0372381 A1 | 12/2017 | Swinson et al. | |
| 2018/0158086 A1 | 6/2018 | Taira et al. | |

(56) References Cited

U.S. PATENT DOCUMENTS

| | | | |
|---|---|---|---|
| 2019/0034983 A1 | 1/2019 | Swinson et al. | |
| 2019/0139065 A1 | 5/2019 | Taira et al. | |
| 2019/0172103 A1 | 6/2019 | Swinson et al. | |
| 2019/0180305 A1 | 6/2019 | Inghelbrecht et al. | |
| 2019/0180306 A1 | 6/2019 | Inghelbrecht et al. | |

FOREIGN PATENT DOCUMENTS

| | | | |
|---|---|---|---|
| CN | 1892691 | 1/2007 | |
| CN | 101785023 A | 7/2010 | |
| EP | 1326176 | 7/2003 | |
| JP | 2001-117973 | 4/2001 | |
| JP | 2001-155106 | 6/2001 | |
| JP | 2001-209674 | 8/2001 | |
| JP | 2001-256356 | 9/2001 | |
| JP | 2001-306851 | 11/2001 | |
| JP | 2002-117275 | 4/2002 | |
| JP | 2002-132827 | 5/2002 | |
| JP | 2002-329097 | 11/2002 | |
| JP | 2002-358478 | 12/2002 | |
| JP | 2003-024387 | 1/2003 | |
| JP | 2003-108811 | 4/2003 | |
| JP | 2003-108847 | 4/2003 | |
| JP | 2003-173406 | 6/2003 | |
| JP | 2004-070534 | 3/2004 | |
| JP | 2004-516554 | 6/2004 | |
| JP | 2004-213065 | 7/2004 | |
| JP | 2006-268635 | 10/2006 | |
| JP | 2007-122197 | 5/2007 | |
| JP | 2008-058039 | 3/2008 | |
| JP | 2008-165764 | 7/2008 | |
| WO | WO200140898 A2 | 6/2001 | |
| WO | WO 2007002684 A1 * | 1/2007 | ............ G06Q 30/02 |
| WO | WO-2007002754 A2 * | 1/2007 | ............ G06Q 30/02 |
| WO | WO2007002754 A2 | 1/2007 | |
| WO | WO200140898 A3 | 11/2007 | |
| WO | WO 2010030632 A1 * | 3/2010 | ........... G06Q 10/067 |

OTHER PUBLICATIONS

14031930 EIC 3600 Search Results—060419 (Year: 2019).*
Office Action issued for U.S. Appl. No. 13/173,357, dated Mar. 9, 2015, 26 pages.
Office Action issued for European Application No. 15159912.3, dated May 18, 2016, 4 pages.
Notice of Allowance issued for Japanese Patent Application No. 2014-522939, dated May 31, 2016, 3 pages.
Office Action issued for U.S. Appl. No. 14/145,252, dated Jun. 15, 2016, 10 pages.
Office Action issued for U.S. Appl. No. 13/951,292, dated Jun. 20, 2016, 17 pages.
Office Action issued for U.S. Appl. No. 14/666,005, dated Apr. 21, 2015, 12 pages.
Extended European Search Report issued for European Patent Application No. 15159912.3, dated May 19, 2015, 8 pages.
Office Action issued for U.S. Appl. No. 14/145,252, dated Jun. 26, 2015, 21 pages.
Office Action issued for U.S. Appl. No. 14/666,005, dated Sep. 11, 2015, 13 pages.
Office Action issued for U.S. Appl. No. 13/173,357, dated Oct. 2, 2015, 30 pages.
Office Action issued for U.S. Appl. No. 14/145,252, dated Oct. 6, 2015, 26 pages.
Office Action issued for Canadian Patent Application No. 2,736,477, dated Nov. 18, 2015, 6 pages.
Office Action issued for U.S. Appl. No. 12/179,164, dated Nov. 23, 2015, 21 pages.
Osler, Brian, "Rip-Off USA: The North American Car Market," Consumer Policy Review, Nov./Dec. 2002, vol. 12, No. 6, pp. 1-7.
Office Action issued for Japanese Patent Application No. 2014-522909, dated Nov. 6, 2015, 13 pages.
Office Action issued for U.S. Appl. No. 14/666,005, dated Apr. 18, 2016, 10 pages.
Office Action issued for European Application No. 12817230.1, dated Mar. 16, 2016, 4 pages.
International Search Report and Written Opinion for PCT Application No. PCT/US2009/056316, dated Oct. 26, 2009, 7 pages.
International Search Report and Written Opinion for PCT Application No. PCT/US2009/056315, dated Oct. 20, 2009, 7 pages.
International Search Report and Written Opinion for PCT Application No. PCT/US2009/056317, dated Dec. 10, 2009, 8 pages.
Office Action issued for U.S. Appl. No. 12/556,137, dated Sep. 1, 2010, 14 pages.
Cars.com, http://cars.com/ Internet Archive Jul. 18, 2007—http://web.archive.org/web/20070718071752/www.car.com/, printed Aug. 27, 2010, 2 pages.
Office Action issued for U.S. Appl. No. 12/556,137, dated Dec. 30, 2010, 15 pages.
Edmunds.com http://www.edmunds.com/Internet Archive Jan. 18, 2010—http://web.archive.org/web/20080118210310/http://www.edmunds.com/ printed Dec. 15, 2010, 3 pages.
Notice of Allowance issued in U.S. Appl. No. 12/556,137, dated Feb. 10, 2011, 9 pages.
Office Action issued for U.S. Appl. No. 13/080,832, dated Oct. 12, 2011, 12 pages.
2nd Written Opinion issued for PCT Application No. PCT/US09/56317, dated Dec. 6, 2011, 6 pages.
Office Action issued for U.S. Appl. No. 12/556,076 dated Dec. 27, 2011, 13 pages.
Office Action issued for U.S. Appl. No. 12/556,109 dated Jan. 24, 2012, 16 pages.
Notice of Allowance issued for U.S. Appl. No. 13/080,832 dated Feb. 10, 2012, 11 pages.
"CarPrices.com, Selectica and JATO Dynamics Enter Agreement to Deliver Online Car Configuration Package", Business Wire, Dec. 13, 1999, 5 pages.
Office Action issued for U.S. Appl. No. 12/556,076, dated Mar. 26, 2012, 14 pages.
Office Action issued for U.S. Appl. No. 12/556,109, dated Mar. 26, 2012, 15 pages.
Goldberg, "Job Security through PPC-CRM Integration", paydigest.com, published Aug. 22, 2007.
Sauberlich, et al. "Analytical Lead Management in the Automotive Industry," Data Analysis and Decision Support, Springer Heidelberg Berlin 2005, pp. 290-299.
Office Action issued for U.S. Appl. No. 11/968,137, dated Dec. 23, 2010, 8 pages.
Office Action issued for U.S. Appl. No. 11/968,137, dated Jun. 9, 2011, 9 pages. '137 application.
Office Action issued for U.S. Appl. No. 11/968,137, dated Dec. 19, 2011, 10 pages.
Gregory M. Collins, "Technology Opens Up Huge CRM Opportunities for Retailers," Jun. 10, 2002. Retrieved from http://www.destinationcrm.com/Articles/PrintArticle.aspx?ArticleID=474 19, 3 pages.
Rick Gibbs, "How Google Base Replaces Autos Classifieds", Nov. 27, 2006. Retrieved from http://www.imediaconnection.com/printpage.aspx?id=12548, 4 pages.
No Author, "3 Reasons Why Using Google Pays Off for Automobile Dealers," 2005 Retrieved from http://www.kaistudios.com/PPC/guides/Google-autodealers.htm, 2 pages.
Office Action issued for U.S. Appl. No. 12/179,164, dated Sep. 30, 2009, 19 pages.
Office Action issued for U.S. Appl. No. 12/179,164, dated Apr. 8, 2010, 20 pages.
"Innovative Website Moves Consumer Auto Purchases Online: Capital One Offers Miami Buyers a One-Stop Resource for Car Purchase, Putting an End to Hassles and Fustration," Business Wire, Jul. 18, 2006, 3 pages.
Office Action issued for U.S. Appl. No. 12/179,164, dated Oct. 27, 2010, 20 pages.
Office Action issued for U.S. Appl. No. 12/179,164, dated Feb. 15, 2011, 20 pages.

(56) References Cited

OTHER PUBLICATIONS

Office Action issued for U.S. Appl. No. 12/179,164, dated Sep. 2, 2011, 21 pages.
International Preliminary Report on Patentability (IPRP) issued for PCT Patent Application No. PCT/US2009/056316, dated May 1, 2012, 6 pages.
Extended European Search Report issued for European Patent Application No. 09 813 513.0, dated Feb. 21, 2012, 8 pages.
Extended European Search Report issued for European Patent Application No. 09 813 514.8, dated Apr. 25, 2012, 5 pages.
International Preliminary Report on Patentability (IPRP) issued for PCT Patent Application No. PCT/US2009/056315, dated May 16, 2012, 6 pages.
Notice of Allowance issued for U.S. Appl. No. 11/968,137, dated May 9, 2012, 6 pages.
Office Action issued for U.S. Appl. No. 12/179,164, dated May 25, 2012, 21 pages.
Corrected Notice of Allowability for U.S. Appl. No. 13/080,832, dated Jun. 7, 2012, 4 pages.
Corrected Notice of Allowability for U.S. Appl. No. 13/080,832, dated Jun. 8, 2012, 4 pages.
Office Action issued for Chinese Patent Application No. 200980141911.3, dated May 30, 2012, 4 pages.
Office Action (with English translation) for Chinese Patent Application No. 200980142589.6, dated Sep. 5, 2012, 9 pages.
International Preliminary Report on Patentability for International Patent Application No. PCT/US2009/056317, dated Sep. 27, 2012, 8 pages.
Office Action issued for U.S. Appl. No. 12/179,164, dated Oct. 9, 2012, 20 pages.
"Zag Acquires Automotive Invitational Services, Auto-Buying Service for More than 6 Million AAA Members," Business Wire, Jun. 13, 2006, 3 pages.
Office Action issued for U.S. Appl. No. 13/524,116, dated Nov. 27, 2012, 13 pages.
Office Action issued for U.S. Appl. No. 12/179,164, dated Jan. 29, 2013, 19 pages.
Office Action issued for Chinese Patent Application No. 200980141911.3, dated Feb. 6, 2013, 9 pages.
Examination Report issued for European Patent Application No. 09 813 513.0, dated Mar. 20, 2013, 7 pages.
Notice of Allowance issued for U.S. Appl. No. 13/524,116, dated Apr. 25, 2013, 8 pages.
"Carfax and EDS Announce New On-Line Service," Pr Newswire, Oct. 13, 1994, 2 pages.
Office Action issued for U.S. Appl. No. 12/179,164, dated May 8, 2013, 19 pages.
Office Action issued for Chinese Patent Application No. 200980142589.6, dated Apr. 15, 2013, 10 pages.
Notice of Allowance issued for U.S. Appl. No. 11/968,137, dated Jun. 12, 2013, 6 pages.
Notice of Allowance issued for U.S. Appl. No. 12/556,076, dated Jul. 18, 2013, 13 pages.
Notice of Allowance issued for U.S. Appl. No. 12/556,109, dated Jul. 30, 2013, 10 pages.
Office Action (with English Translation) for Japanese Patent Application No. 2011-526297, dated Jul. 22, 2013, 19 pages.
Office Action (with English translation) for Japanese Patent Application No. 2011-526298, dated Jul. 22, 2013, 21 pages.
Office Action (with English translation) for Chinese Patent Application No. 200980141911.3, dated Jul. 26, 2013, 20 pages.
Notice of Allowance issued for U.S. Appl. No. 12/896,145, dated Jul. 26, 2013, 17 pages.
Office Action issued for Chinese Patent Application No. 200980142589.6, dated Oct. 21, 2013, 13 pages.
Office Action issued for U.S. Appl. No. 13/942,375, dated Nov. 20, 2013, 13 pages.
Office Action issued for U.S. Appl. No. 12/179,164, dated Jan. 3, 2014, 23 pages.
Notice of Allowance issued for U.S. Appl. No. 12/556,076, dated Jan. 16, 2014, 6 pages.
Notice of Allowance issued for U.S. Appl. No. 12/556,109, dated Jan. 24, 2014, 5 pages.
Office Action (with English translation) for Chinese Patent Application No. 200980141911.3, dated Feb. 21, 2014, 14 pages.
Notice of Allowance issued for Japanese Patent Application No. 2011-526297, dated Mar. 28, 2014, 3 pages.
Notice of Allowance issued for Japanese Patent Application No. 2011-526298, dated Mar. 28, 2014, 3 pages.
Office Action issued for U.S. Appl. No. 12/179,164, dated May 6, 2014, 13 pages.
Office Action issued for Chinese Patent Application No. 200980142589.6, dated May 8, 2014, 10 pages.
Office Action issued for U.S. Appl. No. 13/942,375, dated Jun. 12, 2014, 17 pages.
Office Action issued in U.S. Appl. No. 14/256,796, dated Aug. 14, 2014, 12 pages.
Office Action issued in U.S. Appl. No. 14/256,791, dated Aug. 26, 2014, 12 pages.
Office Action issued in U.S. Appl. No. 12/556,076, dated Sep. 2, 2014, 7 pages.
Office Action issued in U.S. Appl. No. 12/556,109, dated Sep. 2, 2014, 7 pages.
Office Action issued in U.S. Appl. No. 12/179,164, dated Sep. 15, 2014, 15 pages.
Office Action issued in U.S. Appl. No. 13/942,375, dated Oct. 6, 2014, 6 pages.
Notice of Allowance issued for U.S. Appl. No. 14/256,791, dated Dec. 22, 2014, 12 pages.
Office Action issued for U.S. Appl. No. 12/179,164, dated Dec. 24, 2014, 14 pages.
Notice of Allowance issued for U.S. Appl. No. 12/556,109, dated Dec. 30, 2014, 8 pages.
Notice of Allowance issued for U.S. Appl. No. 14/256,796, dated Dec. 31, 2014, 11 pages.
Notice of Allowance issued for U.S. Appl. No. 12/556,076, dated Jan. 5, 2015, 8 pages.
International Search Report and Written Opinion issued for PCT Application No. PCT/US2012/047672, dated Oct. 10, 2012, 7 pages.
Office Action issued for U.S. Appl. No. 13/554,743, dated Nov. 8, 2012, 18 pages.
Office Action issued for U.S. Appl. No. 13/554,743, dated May 31, 2013, 35 pages.
Notice of Allowance issued for U.S. Appl. No. 13/554,743, dated Sep. 30, 2013, 15 pages.
Debruine et al. "Capacity Costs with Time-Based and Use-Based Asset Value Attrition," Accounting Horizons, vol. 25, No. 2, 2011, pp. 337-356.
Hartman, "Automobile Replacement Case Studies for Engineering Economy Classes," The Engineering Economist, Spring 1998, vol. 43, No. 3, pp. 278-289.
Ohta et al, "Automobile Prices Revisited: Extensions of the Hedonic Hypothesis," Household Production and Consumption, National Bureau of Economic Research, 1976, vol. ISBN: 0-870-14515-0, pp. 325-398.
Prado, "The European Used-Car Market at a Glance: Hedonic Resale Price Valuation in Automotive Leasing Industry," Aug. 2009, Economics Bulletin, vol. 29 No. 3 pp. 2086-2099.
International Preliminary Report on Patentability issued for PCT Application No. PCT/US2012/047672, dated Apr. 3, 2014, 6 pages.
Office Action issued for U.S. Appl. No. 14/145,252, dated Dec. 3, 2014, 18 pages.
International Search Report and Written Opinion issued for PCT Application No. PCT/US12/44128, dated Sep. 12, 2012, 6 pages.
International Preliminary Report on Patentability issued for PCT Application No. PCT/US12/44128, dated Jan. 16, 2014, 5 pages.
Office Action issued for U.S. Appl. No. 13/173,357, dated Jul. 31, 2013, 19 pages.
Office Action issued for U.S. Appl. No. 13/173,357, dated Feb. 26, 2014, 28 pages.

(56) References Cited

OTHER PUBLICATIONS

Office Action issued for U.S. Appl. No. 14/054,390, dated Dec. 3, 2014, 13 pages.
Extended European Search Report issued for European Patent Application No. 12817230.1, dated Dec. 15, 2014, 5 pages.
Decision of Rejection issued for Chinese Patent Application No. 200980142589.6, dated Nov. 13, 2014, 10 pages.
Office Action issued for Canadian Patent Application No. 2,837,338, dated Feb. 1, 2016, 4 pages.
Office Action issued for Canadian Patent Application No. 2,736,477, dated Nov. 28, 2016, 6 pages.
Office Action issued for Canadian Patent Application No. 2,837,338, dated Dec. 28, 2016, 4 pages.
Notice of Allowance issued for Japanese Patent Application No. 2016-021490, dated Feb. 16, 2017, 3 pages.
Office Action issued for U.S. Appl. No. 12/179,164, dated Feb. 28, 2017, 17 pages.
Office Action issued for U.S. Appl. No. 14/145,252, dated Apr. 19, 2017, 11 pages.
Office Action issued for U.S. Appl. No. 15/396,225, dated Apr. 19, 2017, 13 pages.
Office Action issued for U.S. Appl. No. 12/179,164, dated Oct. 6, 2016, 10 pages.
Office Action issued for U.S. Appl. No. 14/026,111, dated Oct. 19, 2016, 24 pages.
Office Action issued for U.S. Appl. No. 14/145,252, dated Oct. 20, 2016, 9 pages.
Office Action issued for Chinese Application No. 201280035029.9, dated Sep. 29, 2016, 15 pages.
Office Action issued for U.S. Appl. No. 13/951,292, dated Nov. 22, 2016, 9 pages.
Reexamination Decision issued for Chinese Application No. 200980142589.6, dated Nov. 29, 2016, 12 pages.
Office Action issued for U.S. Appl. No. 14/068,836, dated Dec. 22, 2016, 9 pages.
Office Action issued for U.S. Appl. No. 13/173,357, dated May 3, 2017, 26 pages.
Office Action issued for U.S. Appl. No. 14/026,111, dated May 26, 2017, 33 pages.
Notice of Allowance issued for Chinese Application No. 201280035026.9, dated May 25, 2017, 2 pages.
Notice of Allowance issued for U.S. Appl. No. 14/068,836, dated Jun. 26, 2017, 14 pages.
Notice of Allowance issued for U.S. Appl. No. 14/461,205, dated Aug. 22, 2017, 17 pages.
Office Action issued for U.S. Appl. No. 14/145,252, dated Aug. 24, 2017, 18 pages.
Office Action issued for Chinese Application No. 200980142589.6, dated Jul. 1, 2016, 4 pages.
Office Action issued for U.S. Appl. No. 14/068,836, dated Jul. 20, 2016, 13 pages.
Office Action issued for U.S. Appl. No. 14/666,005, dated Sep. 1, 2016, 7 pages.
Notice of Allowability issued for U.S. Appl. No. 14/671,731, dated Jan. 19, 2018, 5 pages.
Office Action issued for U.S. Appl. No. 14/145,252, dated Jan. 10, 2018, 12 pages.
Office Action issued for U.S. Appl. No. 15/396,225, dated Jan. 23, 2018, 14 pages.
Office Action issued for Canadian Patent Application No. 2,837,338, dated Feb. 2, 2018, 5 pages.
Summons to Attend Oral Proceedings issued for European Patent Application No. 12817230.1, dated Feb. 9, 2018, 10 pages.
Office Action issued for U.S. Appl. No. 14/026,111, dated Feb. 28, 2018, 41 pages.
Office Action issued for U.S. Appl. No. 13/173,357, dated Oct. 30, 2017, 28 pages.
Office Action issued for U.S. Appl. No. 15/396,225, dated Oct. 19, 2017, 14 pages.
Office Action issued for Canadian Application No. 2,736,477, dated Nov. 3, 2017, 4 pages.
Notice of Allowance issued for U.S. Appl. No. 15/631,318, dated Dec. 12, 2017, 16 pages.
Notice of Allowance issued for U.S. Appl. No. 14/671,731 dated Dec. 15, 2017, 17 pages.
Notice of Allowance issued for U.S. Appl. No. 14/145,252, dated Jun. 20, 2018, 8 pages.
Office Action issued for U.S. Appl. No. 13/173,357, dated Apr. 16, 2018, 11 pages.
Office Action issued for U.S. Appl. No. 15/864,855, dated May 29, 2018, 13 pages.
Notice of Allowance issued for U.S. Appl. No. 15/674,317, dated Jan. 17, 2019, 11 pages.
Notice of Allowance issued for U.S. Appl. No. 15/391,541, dated Jan. 23, 2019, 11 pages.
Notice of Allowance issued for U.S. Appl. No. 15/393,505, dated Jan. 28, 2019, 15 pages.
Notice of Allowance issued for U.S. Appl. No. 13/173,357, dated Feb. 27, 2019, 8 pages.
Office Action issued for Canadian Patent Application No. 2,837,338, dated Feb. 28, 2019, 5 pages.
Notice of Allowance issued for U.S. Appl. No. 15/864,855, dated Oct. 2, 2018, 6 pages.
Notice of Allowance issued for U.S. Appl. No. 13/173,357, dated Oct. 25, 2018, 12 pages.
Office Action issued for Canadian Patent Application No. 2,736,477, dated Oct. 31, 2018, 5 pages.
Notice of Allowance issued for U.S. Appl. No. 16/272,396, dated Jul. 15, 2019, 10 pages.
Notice of Allowance issued for U.S. Appl. No. 16/277,553, dated Aug. 16, 2019, 10 pages.
Notice of Allowance issued for U.S. Appl. No. 16/277,434, dated Aug. 19, 2019, 10 pages.
Notice of Allowance issued for U.S. Appl. No. 16/193,618, dated Sep. 23, 2019, 10 pages.
Office Action issued for U.S. Appl. No. 15/391,563, dated Sep. 25, 2019, 19 pages.

* cited by examiner

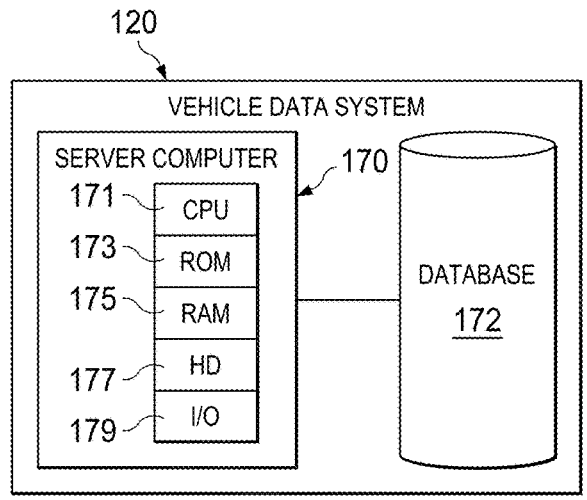
FIG. 2
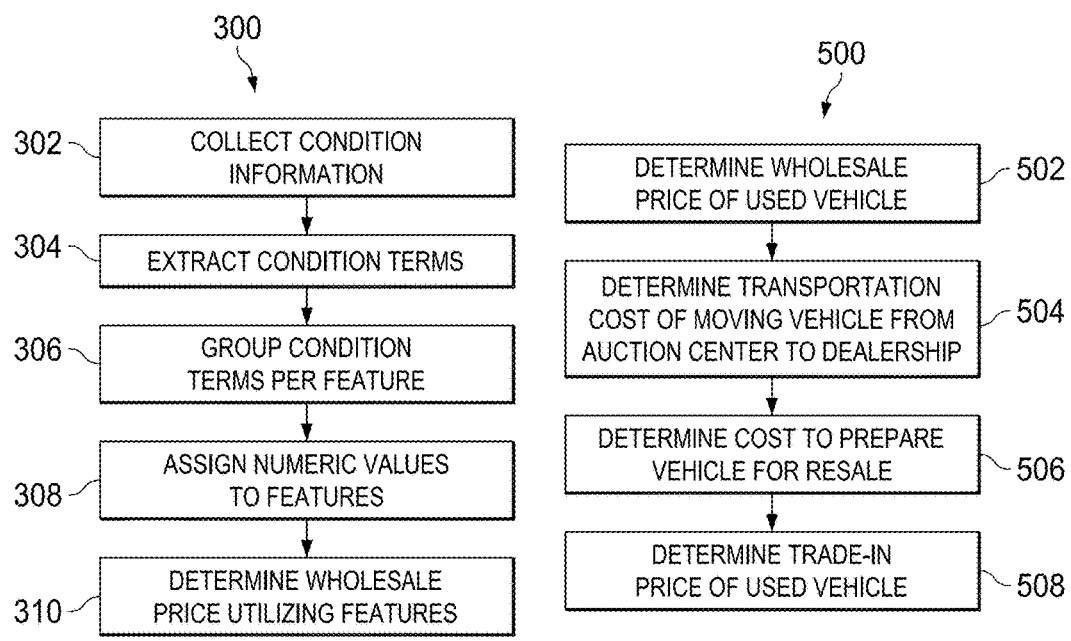
FIG. 3
FIG. 5

WHOLESALE/TRADE-IN PRICING SYSTEM, METHOD AND COMPUTER PROGRAM PRODUCT THEREFOR

CROSS-REFERENCE TO RELATED APPLICATION(S)

This is a conversion of, and claims a benefit of priority from U.S. Provisional Application No. 61/758,017, filed Jan. 29, 2013, entitled, "WHOLESALE/TRADE-IN PRICING SYSTEM, METHOD AND COMPUTER PROGRAM PRODUCT THEREFOR," which is fully incorporated herein by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to systems and methods that determine wholesale pricing items. More particularly, embodiments disclosed herein relate to a system, method and computer program product that determine wholesale prices for durable goods such as used vehicles.

BACKGROUND OF THE RELATED ART

Many challenges exist in wholesale pricing, particularly in used vehicle wholesale pricing. For example, one challenge is to accurately estimate the wholesale value of a used vehicle given its trim, options, condition, mileage, and other factors that could potentially affect the valuation process. Also, intelligently processing the raw data is also difficult, given a large portion of the vehicle condition terms are in free-text form.

One existing method estimates the wholesale value for used cars at a fixed level of vehicle grouping, independent of vehicle conditions. For example, all 2010 Ford Explorers would be considered to have the same value. This method has several drawbacks. For instance, the identified value may be inaccurate as a result of a scarcity of data, especially for older vehicles. Furthermore, if vehicle conditions are ignored, these fixed estimated values can be extremely inaccurate. For instance, the value of a vehicle that is in excellent condition may be thousands of dollars higher than the value of a vehicle of the identical make, model and year that is in poor condition.

The inability to accurately determine the value of an item such as a used vehicle may make it difficult for an automobile dealer to buy and sell used vehicles. Consider an automobile dealer who must decide how much to offer for a vehicle taken as a trade-in. The amount of money offered by the dealer for the trade-in is affected by the decision to wholesale the vehicle or resell it at retail, the cost of repairing or reconditioning the vehicle, transportation costs, and so on. If the dealer cannot accurately determine the amount to offer for the trade-in, he may lose money on the transaction.

It would therefore be desirable to provide improved means for determining values of items such as used vehicles.

SUMMARY OF THE DISCLOSURE

Embodiments disclosed herein provide a system and method for determining wholesale prices for previously owned items. In example embodiments disclosed herein, used vehicles are used. However, embodiments can be implemented for pricing various types of previously owned items.

One embodiment comprises a system having a computer processor, a network interface, a data storage device, and an output device which are communicatively coupled to each other. The processor is configured to collect, via the network interface, historical sales information from one or more data sources external to the system. The processor stores the collected historical sales information on the data storage device. Based on the collected historical sales information, the processor determines a retail price for a target vehicle. The processor also collects condition information from a user input device, where the information indicates conditions associated with the target vehicle. Based on the conditions associated with the target vehicle, the processor determines price modifications for the target vehicle. The processor then determines a wholesale price of the target vehicle based on the retail price and the modifications from the condition information. The processor then outputs the wholesale price to a user via the output device.

The processor may be configured to collect condition information in a textual form and then extract condition terms that are associated with individual conditions from the text. The processor may then associate numeric values with the extracted terms, and store the numeric values in the data storage device. The processor may also group the condition terms together and associate numeric values with corresponding groups of the condition terms. Alternatively, the system may be configured to display graphical user interface screens to a user to prompt input of the condition information. The system may be configured to collect wholesale sale transaction cost information from one or more data sources such as auction houses. This wholesale sale transaction cost information can be used to determine a trade-in value of the target vehicle. The system may also be configured to collect wholesale cost information from multiple, different auction locations and then determine separate trade-in values for each of the different auction locations. The system may be configured to collect and store repair cost information so that, when a condition identified for the target vehicle requires a repair, the associated cost can be retrieved and deducted from the value of the vehicle.

An alternative embodiment comprises a method for determining pricing information. In this method, historical sales information is collected from one or more data sources, such as auction houses, dealers, sales data companies, etc. The collected historical sales information is stored on a data storage device. A retail price is then determined for a target vehicle based on the collected historical sales information. Condition information that identifies conditions associated with the target vehicle is collected from a user input device. This may involve, for example, presenting graphical user input screens which enable a user to enter information indicating the condition of the vehicle. Related conditions may be grouped together, and textual or other non-numeric information may be converted to numeric values to facilitate their use in determining the value of the vehicle. The condition information and associated repair cost information may be stored for use in determining the value of the vehicle. A wholesale price for the target vehicle is determined based on the retail price, features of the vehicle, and condition of the vehicle. The wholesale price is provided to a user through an output device (e.g., a display device). A trade-in price may also be determined for the target vehicle by deducting the costs (e.g., transportation, auction fees, profit, etc.) associated with a wholesale sale transaction from the wholesale price. Different wholesale and/or trade-in prices may be determined for different wholesale outlets.

Yet another alternative embodiment comprises a computer program product. The computer program product is a tangible, computer-readable medium that stores program instructions which are executable by a computer to perform a method such as the one described above. Many other alternative embodiments are possible as well.

Embodiments disclosed herein can leverage a retail pricing model to estimate the retail price of a used vehicle. Textual information on the condition of the used vehicle may be collected and clustered to consider and account for features that may affect the price. Embodiments can determine a value for each feature, the cost of a repair at a certain level, and the likelihood or probability that the repair is needed. From there, embodiments can evaluate the wholesale price for the used vehicle utilizing an approach that is similar to the retail pricing model. For example, embodiments may determine a retail price for the used vehicle. If the used vehicle is in a salvable condition, embodiments may determine from the wholesale data what the cost to repair the damages to the used vehicle is and subtract the cost from the retail price to produce a wholesale price for the used vehicle.

Embodiments can provide many advantages. For example, the new approach provides multi-level grouping to solve the data scarcity issue; models a comprehensive set of factors to generate more accurate estimation; applies machine learning techniques to automatically cluster condition terms and allows the model to assess the impact. In some embodiments, the condition data and wholesale prices can be utilized to provide more accurate trade-in prices.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 depicts a simplified diagrammatic representation of a computing system architecture in which one embodiment of a vehicle data system may be implemented;

FIG. 3 depicts a flow diagram illustrating an example embodiment of a wholesale pricing method;

Figure 4B:
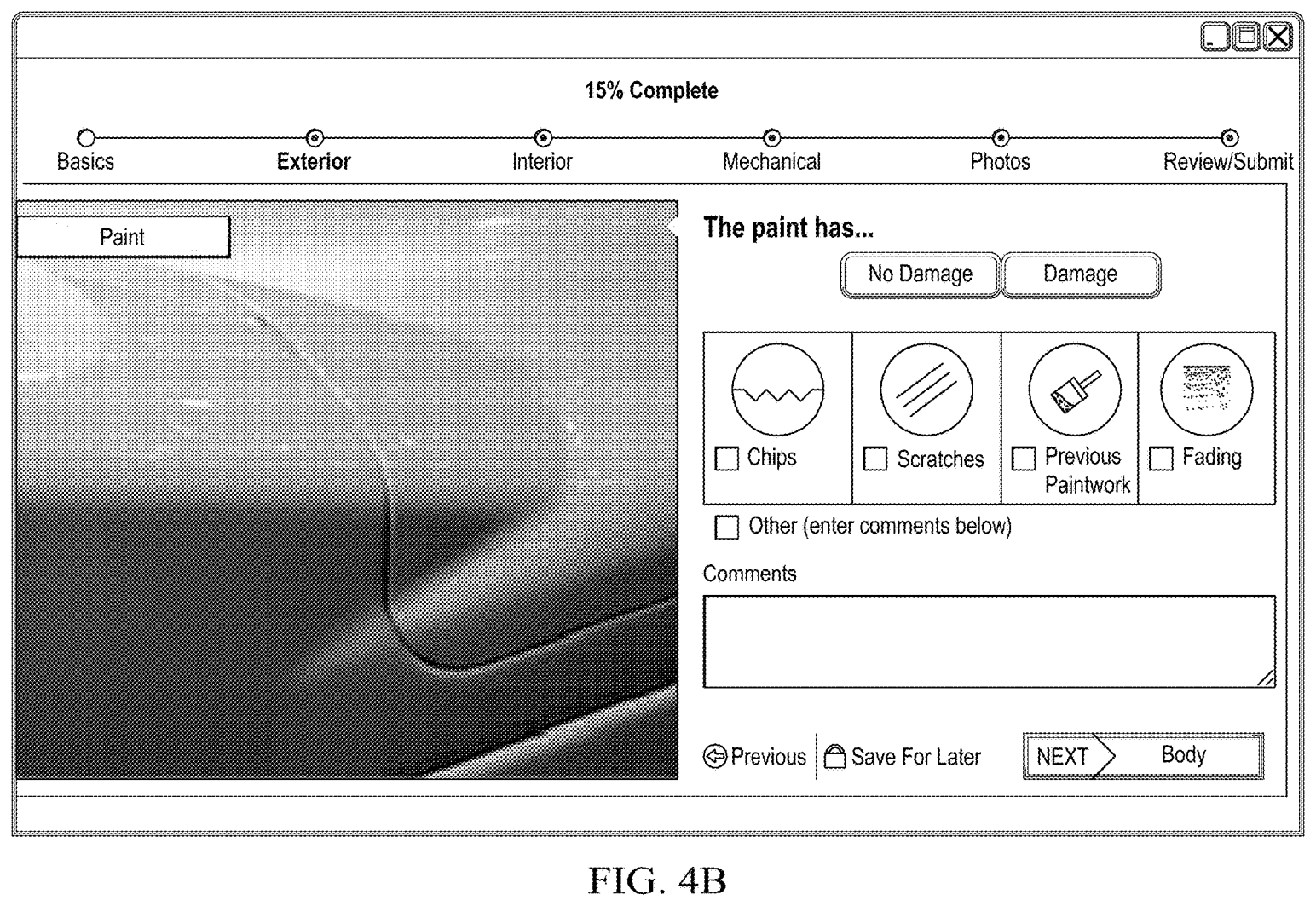
Figure 4C:
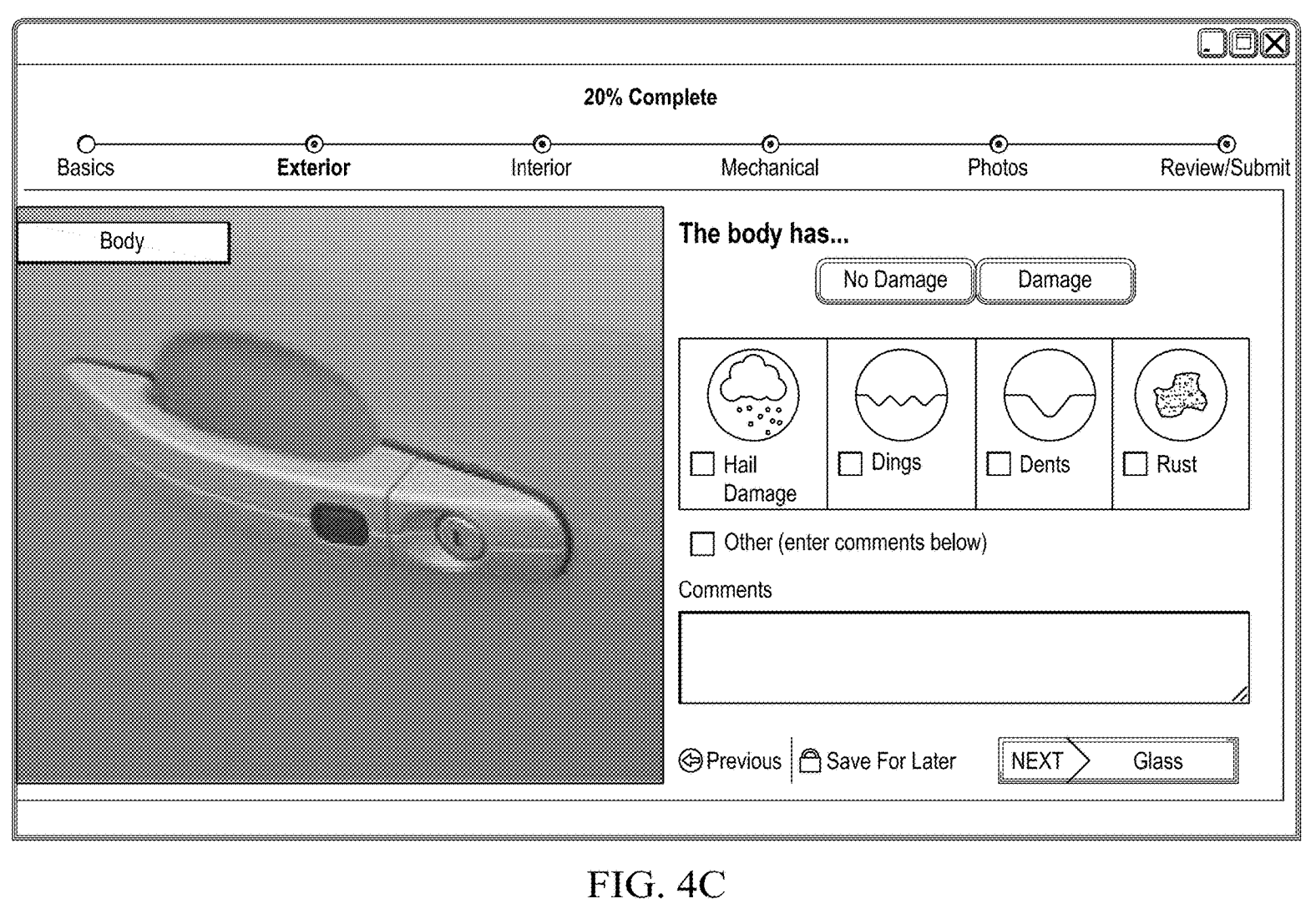

FIGS. 4A-4D depict diagrammatic representations of sample input screens of an example user interface configured for soliciting and collecting vehicle condition information; and FIG. 5 depicts a flow diagram illustrating an example embodiment of a trade-in pricing method.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Figure 1:
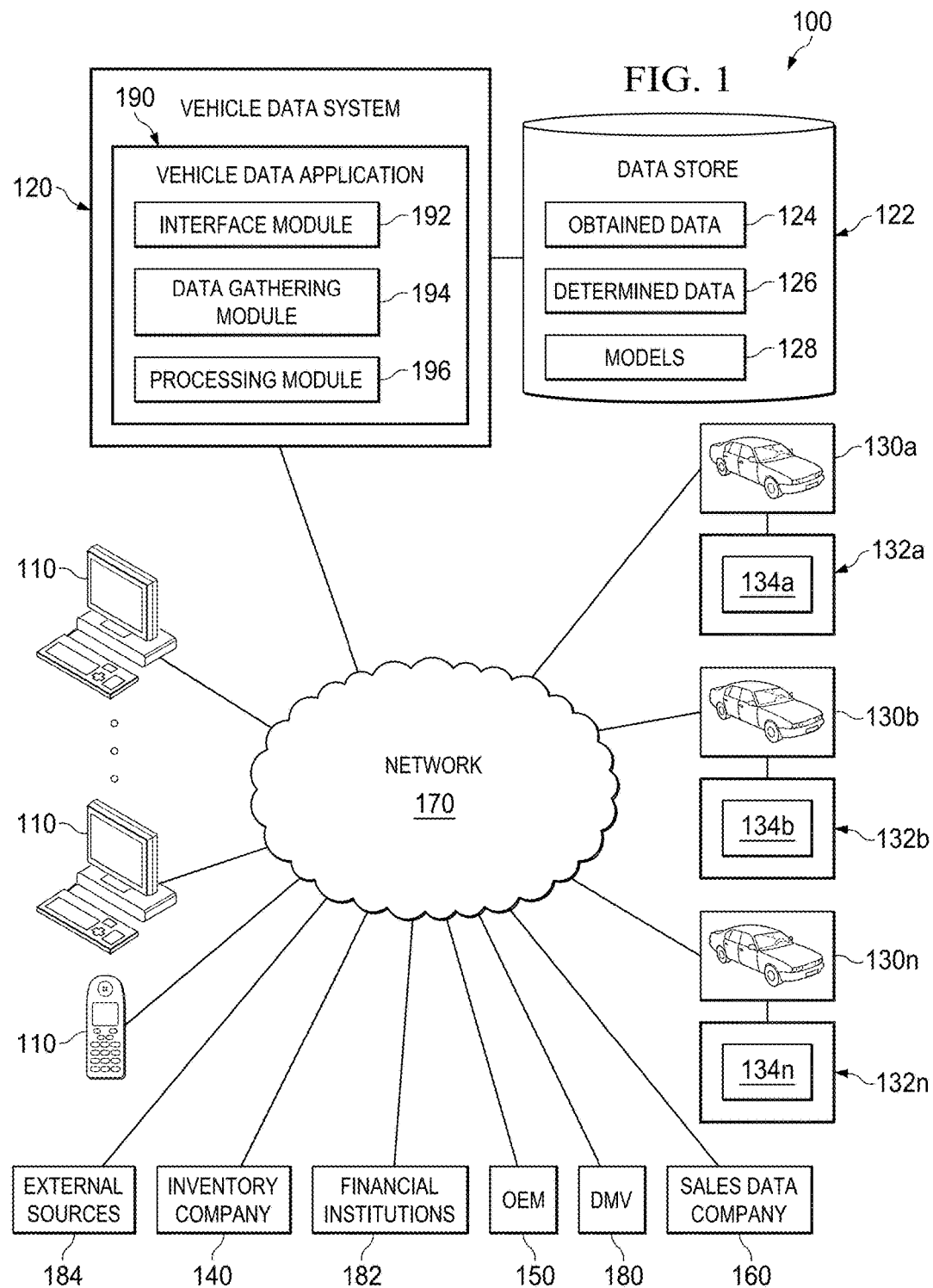
FIG. 1 depicts a diagrammatic representation of an example topology in which embodiments may be implemented.
Figure 4A:
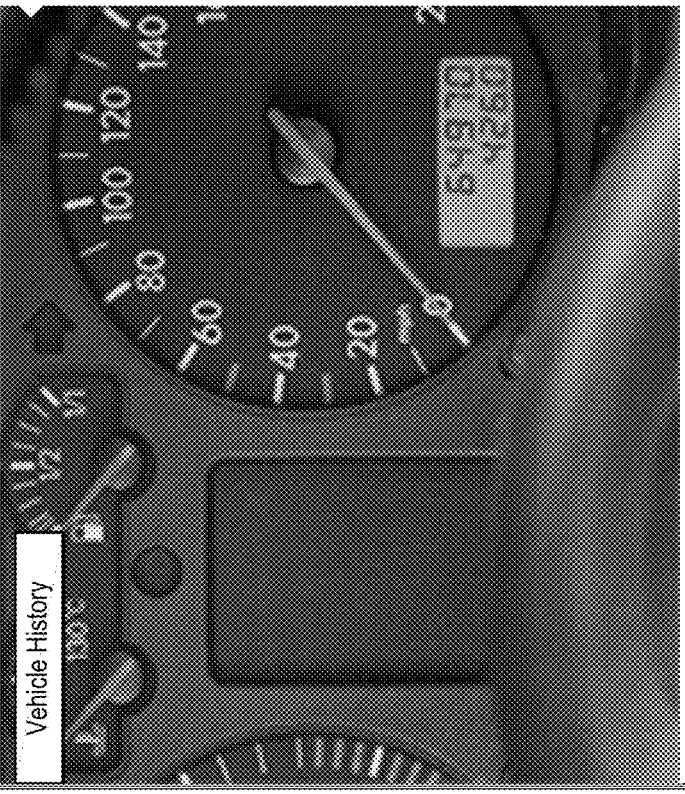
Figure 4D:
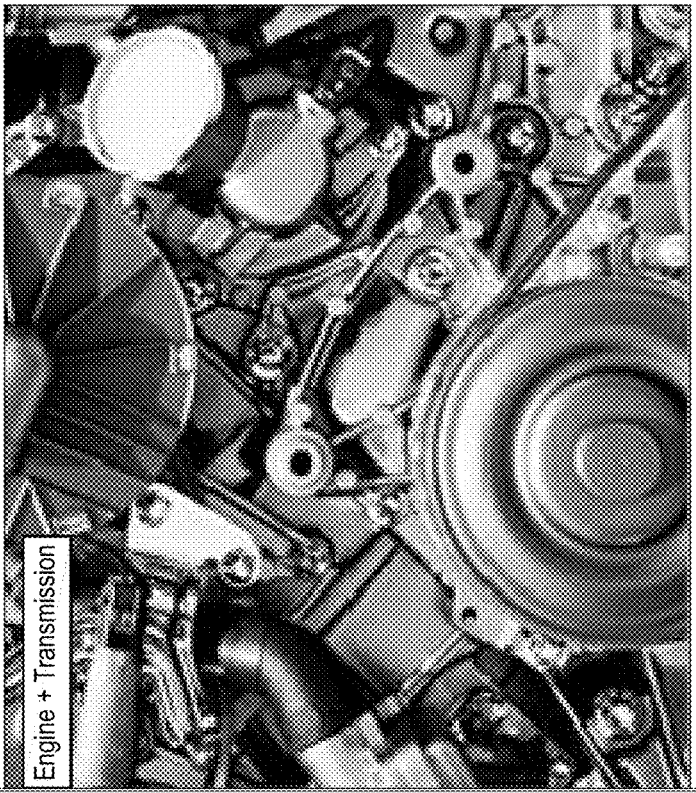

Before discussing specific embodiments, a brief overview of the context of the disclosure may be helpful. FIG. 1 depicts one embodiment of a topology which may be used to implement embodiments of the systems and methods disclosed herein. Topology 100 comprises a set of entities including vehicle data system 120 which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations such as car dealers 130a . . . n. Computing devices 110 may be used by consumers while conducting a search for consumer goods and/or services, such as automobiles. Network 170 may be for example, a wireless or wired communication network such as the Internet or wide area network (WAN), publicly switched telephone network (PTSN) or any other type of electronic or non-electronic communication link such as mail, courier services or the like.

Referring to FIG. 2 a simplified diagrammatic representation of a computing system architecture in which one embodiment of vehicle data system 120 may be implemented is shown. Those skilled in the art will appreciate that vehicle data system 120 may comprise various alternative architectures. Vehicle data system 120 can include central processing unit ("CPU") 171, read-only memory ("ROM") 173, random access memory ("RAM") 175, hard drive ("HD") or storage memory 177, and input/output device(s) ("I/O") 179. I/O 179 can include a keyboard, monitor, printer, and/or electronic pointing device. Vehicle data system can be implemented on a server computer, desktop computer, a laptop computer, or other types of computer systems. Data storage device 172 may be any suitable type of storage device.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on one or more non-transitory computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality, including utilizing one or more interfaces 192 configured to, for example, receive and respond to queries from users at computing devices 110; interface with inventory companies 140, manufacturers 150, sales data companies 160, financial institutions 182, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 192, vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set on the computing devices 110 and data determined from the processing, and present these interfaces to the user at the user's computing device 110. Interfaces 192 may visually present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the understanding for a user of the presented data, the interface may also present data related to incentives which were utilized to determine the presented data or how such incentives were applied to determine presented data.

Turning to the various other entities in topology 100, dealers 130a . . . n may include a retail outlet for consumer goods and/or services, such as vehicles manufactured by one or more of OEMs 150. To track or otherwise manage sales, finance, parts, service, inventory and back office administration needs, a dealer may employ a dealer management system (DMS) (e.g., DMS132a . . . n). Since many DMSs are Active Server Pages (ASP) based, transaction data (transaction data 134a . . . n) may be obtained directly from the DMS with a "key" (for example, an ID and Password with set permissions within the DMS system) that enables data to be retrieved from the DMS. Many dealers may also have one or more web sites which may be accessed over network 170, where pricing data pertinent to the dealers may be presented on those web sites, including any pre-determined, or upfront, pricing. This price is typically the "no haggle" price (i.e., price with no negotiation) and may be deemed a "fair" price by vehicle data system 120.

Inventory companies 140 may be one or more inventory polling companies, inventory management companies or listing aggregators which may obtain and store inventory data from one or more of dealers 130a . . . n (for example, obtaining such data from DMS 132a . . . n). Inventory polling companies are typically commissioned by the dealer to pull data from a DMS and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from DMS 132 systems of particular dealers 130. These companies may have formal agreements with dealers 130 that enable them to retrieve data from dealer 130 in order to syndicate the collected data for the purposes of internal analysis or external purchase of the data by other data companies, dealers, and OEMs.

Manufacturers 150 can be those entities which actually build the vehicles sold by dealers 130a . . . n. To guide the pricing of their vehicles, manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments disclosed herein, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments disclosed herein.

From time to time, dealers 130 may wish to buy and/or sell vehicles at wholesale prices. Wholesale value is the amount that vehicles may be purchased for at dealer-only, wholesale car auctions. There could be many reasons that a dealer may want to buy or sell in a wholesale marketplace. For example, after a dealer gets a trade-in, the dealer can sell it back to the market (another consumer) at a retail price or sell it at an auction to another dealer at a wholesale price. For example, in one instance, a Mercedes Benz dealer may take a Mercedes sedan as a trade-in, which it may then re-sell to another one of its customers at retail. In another instance, the same Mercedes Benz dealer may take a Ford pickup truck as a trade-in, but may wish to sell the truck at wholesale to a Ford franchise dealership or some independent used car dealer.

A wholesale transaction such as this may be conducted through an auction center or other wholesale outlet. Appropriate pricing of the used vehicle will facilitate the sale of the vehicle, but wholesale pricing can be a complex process. The wholesale value of a vehicle can be impacted by various factors, such as brand, age, vehicle availability, mileage, and condition. Unfortunately, a disconnect exists in how data is captured in the current pricing models, particularly with regard to the condition of a used vehicle. For example, when a vehicle is taken to an auction house, a user may be presented (via a paper form or some computer application interface) with a set of standard questions. The user is allowed to provide in free text form any information about the condition for the vehicle. This condition data may not always be available and if available, it may not be accurate and/or complete.

One difficulty in obtaining the condition data pertains to the level of sophistication of the data sources, in this example, car dealers themselves. In the vehicle wholesale market, both the buyers and the sellers are considered more sophisticated than average end consumers as they know more about what is material to the price of a vehicle. For example, in a retail market, a car may be for sale by an owner. A potential buyer may look at the car and see nothing wrong with the car. A dealer may look at the same car and see that it needs new brakes and new tires. In a wholesale market, a seller may expect a buyer to evaluate a vehicle at a certain level of sophistication and thus may not provide the most accurate and/or complete condition of the vehicle. Because condition data can be essential in evaluating the wholesale value of a used vehicle, there is a desire to capture and extract the condition data.

To accurately estimate the wholesale value of a used vehicle, it may be helpful to first recognize the parties involved in used vehicle sales. Table 1 below illustrates some example types of used vehicle sales.

TABLE 1

| Buyer | Seller | Type |
| --- | --- | --- |
| Individual | Car Dealer | Retail Sale |
| Individual | Individual | Private Party Sale |
| Car Dealer | Car Dealer | Wholesale Sale |
| Car Dealer | Individual | Trade-In |

For discussion and examples of retail pricing on used vehicles, readers are directed to U.S. patent application Ser. No. 13/554,743, filed Jul. 20, 2012, entitled "SYSTEM AND METHOD FOR ANALYSIS AND PRESENTATION OF USED VEHICLE PRICING DATA," which is hereby incorporated by reference in its entirety.

The wholesale value of a used vehicle is usually much lower than its retail price for several reasons. For example, dealers may incur a cost to mitigate a condition before resale and consumers may demand a lower price if the condition goes unaddressed. Understandably, the wholesale value of a used vehicle is generally not affected by any private party sales. However, although the trade-in values are not equal or identical to the wholesale values, when vehicles are appraised for trade-in at a dealership, values similar to their wholesale prices may be offered. Embodiments of trade-in pricing will be further described below. Accordingly, it can be appreciated from Table 1 above that wholesale pricing is particularly useful for dealer-to-dealer used vehicle sales.

As noted above, vehicles being auctioned can include textual descriptions of their conditions (e.g., check-engine light on, windshield cracked, etc.). This data represents important disclosure to bidders about the condition of the vehicles which ultimately affects the price of that vehicle. Including this information into the model produces price predictions that are more accurate because they capture the impact that such conditions have on a vehicle's price. Though this information is expected to influence price, incorporating this data into a model presents several challenges, including:

Textual descriptions of conditions must be transformed into numeric data in order to ascribe some impact to price.

Different text descriptions may describe the same vehicle condition and should be mapped to the same numeric feature.

Some conditions will be used infrequently, which makes understanding their impact with statistical certainty difficult.

Embodiments disclosed herein provide a new approach to address these challenges and accurately estimate wholesale prices of used vehicles. For the sake of discussion, the invention disclosed in the above-referenced U.S. patent application Ser. No. 13/554,743, filed Jul. 20, 2012, entitled "SYSTEM AND METHOD FOR ANALYSIS AND PRESENTATION OF USED VEHICLE PRICING DATA," is referred to herein as the "retail pricing model" and the invention disclosed herein is referred to herein as the "wholesale pricing model." The retail pricing model and the wholesale pricing model can have different data sets. For example, in some embodiments, the wholesale pricing model can include vehicle condition data and auction center location data. Vehicle condition data relates to the particular conditions of a particular used vehicle under evaluation. Auction center location data relates to the specific location from where the used vehicle is to be purchased. Below provides an example list of datasets for a wholesale pricing model:

- Wholesale transactions: this dataset records the historical individual transactions, which contains the core information about the sale including the Vehicle Identification Number (VIN), sale date, vehicle year, make, model, trim, region, sale price, mileage, options, descriptions, etc.
- Geography data: this dataset provides the mappings across zip code, city, state, region, designated market area (DMA), etc.
- Demographic data: this dataset has the demography information such as median household income, median house value at a zip code level.
- Vehicle data: this dataset maintains the vehicle information, such as vehicle year, make, model, trim, engine, transmission, drivetrain, body type, option, manufacturer suggested retail price (MSRP), invoice, etc.
- Condition data: this data is specific to individual vehicles based upon the clustering of condition terms.

The new approach includes taking condition information (e.g., text) of a used vehicle that is given to or obtained by a vehicle data system (e.g., vehicle data system 120) and transforming the textual condition information into a format (e.g., numeric data) that can be used as input in a model. This process is illustrated in FIG. 3. Notice such condition information is not available in the retail pricing model. One reason is that when a dealer lists a used vehicle for sale to end consumers, they tend not to advertise conditions that may not encourage a sale (e.g., "This car has a cracked windshield."). In wholesale transactions, however, such a condition may be available as buyers are dealers themselves.

Accordingly, wholesale pricing method 300 may include step 302, at which condition information on used vehicles may be collected from various data sources by a vehicle data system (e.g., vehicle data system 120). Example data sources may include auction centers and independent used vehicle data providers. In terms of transactions, the collected data set can be similar to the retail pricing model. Additionally, auction centers and third party used vehicle data providers may provide textual condition data as well as geographic data of the auction centers where the vehicles having certain conditions were sold. Different vehicles having the same conditions may be sold at different auction centers for different wholesale prices. The vehicle data system can pull the demographic information associated with the geographic location where auctions have taken place to understand potential factors that may influence the wholesale prices sold at different auction centers. The collected textual condition information may include various types of used vehicle condition information including, for instance, the mechanical, electrical, and aesthetic parts of a used vehicle.

To determine what impact a used vehicle condition (e.g., a cracked windshield) may have to the wholesale price, at step 304, condition terms may be extracted from the textual condition information thus collected. This may involve parsing the collected condition information to extract every unique piece of text. A parser may be configured to parse free form, unbounded ways of describing a condition. Those skilled in the art can appreciate that such a parser can be configured in various ways. The parser parses the raw data, identifies any condition terms of interest in the raw data, and outputs condition terms.

In some embodiments, the condition of the vehicle may be determined in a manner that does not require a conversion from a text-based form. For instance, the system may provide a user interface with input screens that are displayed on a user input device. The screens request information about specific conditions, such as mileage, tire condition, paint condition, upholstery condition, etc. The screens may be designed to elicit detailed information, such as numeric ratings of the conditions (e.g., cracked windshield=1, and no cracks=0), or it may request more general assessments of the conditions, such as "poor", "fair" and "excellent". Information about the vehicle conditions which is input to the system through the screens is then stored for use in determining wholesale and other values for the vehicle. FIGS. 4A-4D depict diagrammatic representations of sample input screens of an example user interface configured for soliciting and collecting vehicle condition information.

One embodiment may further comprise assigning every vehicle a numeric value for every possible feature. So, for every vehicle with "windshield cracked" in the collected description, that vehicle would get a value of 1 in the variable representing the "windshield cracked" factor.

In this embodiment, similar but not identical features would be mapped to separate factors. Accordingly, a vehicle might have a 1 for "windshield cracked" but a 0 for "windscreen cracked". Since the two factors capture the same concept, it would be preferable to have a single factor. To accomplish this, some embodiments of method 300 may implement a clustering approach which assigns all vehicles with either "windshield cracked" or "windscreen cracked" a value of 1.

More specifically, at step 306, the extracted condition terms can be classified, grouped, or otherwise organized into clusters, each representing a defined feature or factor that may affect or influence the wholesale value of a vehicle. These clusters can vary depending upon year, make, model, trim, or some other factors. A goal here is to collapse similar condition terms into a manageable, smaller set of features, each representing a material condition (a condition that matters to the wholesale value. For example, condition terms such as "cracked windshield" and "scratch on the driver's door" may be collapsed into a single feature "need body work" and condition terms such as "check engine light on" and "leaking transmission fluid" may be collapsed into a single feature "need repair" etc.). Even if these condition terms may be encoded at various auction centers, they can be processed and grouped differently at the discretion of the vehicle data system.

The clusters can be constructed in a number of ways. In some embodiments, this step can be accomplished utilizing machine learning algorithms that seek to semantically understand the text and assign them into like groups. For example, a training set can be prepared by correlating known condition terms to a set of groups. An embodiment of the vehicle data system can utilize the training set and machine learning techniques to automatically augment this grouping process. This can be advantageous as there can be unbounded ways of describing the condition of the car. For example, someone may describe a scratch on the driver's side of the door as "about two inches long, six inches from below the handle of the door" and another may describe the same condition as "a short scratch in the center of the driver door."

In some embodiments, different types of body damages may have the same (or essentially the same) impact to the wholesale pricing and thus may be combined into a feature (e.g., "does a dent about the size of a quarter on the right passenger side door cost about the same as a 6-inch scratch that is at the center of the driver side door).

In some embodiments, the same condition terms may have different impacts depending upon the vehicle (e.g., brand, age, etc.) and thus may be clustered into different features. For example, a quarter-sized dent on the hood of a 2012 high-end luxury car is likely to cost more to repair than the same size dent on the bumper of a 2008 entry-level compact car. For the purpose of pricing, these can be different defects as the expectation from the market may be different. Accordingly, even if the description (e.g., "a quarter-sized dent") may be the same or substantially the same, the defects can be clustered into different features.

Additional differentiating factors may include, but are not limited to, the size of a repair, the brand name of the used vehicle, the type of the used vehicle (e.g., 1-ton pickup truck vs. high-end sport car), etc. By carefully assigning the features into groups that are expected to matter, the system can also be made robust to previously unobserved ways of describing the same condition, including misspellings such as "crackd windshield".

In one embodiment, each of the vehicle conditions is associated with an adjustment factor that may range from 0 to 1. If, for example, the condition should result in a 5% reduction in value, the factor will be 0.95. The adjustments may be multiplied to produce an overall condition score for the vehicle. Alternatively, the adjustments may be additive. In this case, a condition necessitating a 5% adjustment would be represented by a value of 0.05, which would be summed with other condition adjustments to produce an overall adjustment that is subtracted from 1 to produce an overall condition score for the vehicle. In either of these cases, the various individual condition scores may also be weighted so that some of the conditions have a greater impact on the overall condition score than others.

The condition score can then be used in several ways. One way is to convert the continuous score to discrete values such as Fair/Good/Excellent. For example, if a vehicle condition score is above 0.7, then the condition is Excellent, if above 0.5, but below 0.7, then it's good. Another way to use the condition score is to use the continuous value to precisely pin-point the condition of the vehicle on a 0 to 1 scale. With the second approach, one may choose to present a Fair/Good/Excellent rating to the consumer, but use the continuous score to adjust the price.

At step 308, numeric values may be assigned to features. Following the above example, a numeric value may be assigned to a feature representing the body work that is needed to repair the (same or different types of) body damages. Those skilled in the art can appreciate that such a numeric transformation may vary depending upon implementation.

After classifying the conditions, the rest of the wholesale pricing model can be similar to the retail pricing model. More specifically, after a set of factors has been constructed from the raw text data, these factors can be included in the model and their impact on the price can be estimated. These estimates can then be used in step 310 as factors in the price estimation model, where they contribute to reducing the errors.

To accurately estimate the sale price and listing price for a given vehicle in the wholesale market, a pricing model using linear regression can be used to model the function of wholesale price, f(price). The price ratio can be determined using the equation:

$$pr_i = \overline{pr}_q + \alpha_o + \alpha_m + \Sigma_j \beta_j \cdot x_i + \Sigma_k \delta_k \cdot y_k + \Sigma_l \lambda_l \cdot z_l + \Sigma_n \theta_n \cdot v_n + \varepsilon_i$$

where the features in set x represent the set of variables which impact the price ratio such as vehicle attributes, the set y represents the condition data (e.g., usage/maintenance, etc.), the set z represents local-level customer and demographic information as well as industry-level data, the set v represents the days-to-sell data, $\alpha_o$ is a global intercept term, and $\alpha_m$ is a make-level intercept applied only when i∈m. Parameters $\hat{\alpha}, \hat{\beta}, \hat{\delta}, \hat{\lambda}, \hat{\theta}$ are weighting factors. The model can be fit using, for example, weighted Ordinary Least Squares (OLS) to find the estimated parameters $\hat{\alpha}, \hat{\beta}, \hat{\delta}, \hat{\lambda}, \hat{\theta}$ that result in the smallest sum of temporally weighted squared residuals.

Then, the retail price can be determined by:

$$\hat{P}_R = \widehat{pr}_i \times \text{depreciated value}_i$$

Then the wholesale price can be determined using the equation:

$$P_w = \hat{P}_R \left\{ \overline{pr}_{WR,q} + \alpha_0 + \alpha_m + \sum_j \beta_j \cdot x_i + \sum_k \delta_k \cdot y_k + \sum_l \lambda_1 \cdot z_1 + \sum_n \theta_n \cdot v_n + \varepsilon_i \right\}$$

where $P_w$ is the wholesale price, $\hat{P}_R$ is the estimated retail price from above (and retail pricing model patent), and $\overline{pr}_{WR,q}$ is the price ratio of wholesale price to computed retail price for the local bin, q. Local bin q is basically the set of transactions that are similar with respect to such things as time, geography, vehicle attributes, and even customer attributes.

A similar methodology can be used to determine a typical trade-in price. In this case, the ratio of historical wholesale prices to retail prices $\overline{pr}_{WR,q}$ would be replaced with the ratio of historical trade-in prices to retail prices $\overline{pr}_{TR,q}$, and the equation would be evaluated to produce the trade-in price, $P_T$.

In another embodiment, the wholesale data can be leveraged to compute trade-in valuations. These valuations may assume a desired profit margin, and adjust the wholesale price based on the profit margin and the costs associated with the expected wholesale transaction. The trade-in price can, in this embodiment, be calculated as:

$$P_T = \hat{P}_W - C_{DA} - C_R - C_A - \pi_D$$

where $P_W$=wholesale price (from wholesale pricing model), $C_{DA}$=transportation cost of shipping the vehicle between the dealership location and the auction location, $C_R$=reconditioning costs, $C_A$=auction listing expenses, and $\pi_D$=the profit margin the dealer would hope to make to ensure the transaction is worthwhile.

The model can be implemented in many ways. For instance, a wholesale pricing model can be made into two phases—backend vs. frontend calculations. The flow of data and logic in such an implementation can be similar to the retail pricing model described in U.S. patent application Ser. No. 13/554,743, filed Jul. 20, 2012, entitled "SYSTEM AND METHOD FOR ANALYSIS AND PRESENTATION OF USED VEHICLE PRICING DATA," which is incorporated herein by reference as if set forth in its entirety. More specifically, the backend process can implement an embodiment of a wholesale pricing model described above and build a research dataset. At the frontend, when a request to estimate the wholesale price of a used vehicle with certain condition is received, the system may utilize the research dataset, dynamically determine a wholesale price for the particular used vehicle, and present the result over a network on a user interface.

In addition to accurately estimating the wholesale price of used vehicles, in some embodiments, this estimation could facilitate dealers deriving proper trade-in values as well. FIG. 5 depicts a flow diagram illustrating an example embodiment of a trade-in pricing method.

While a dealership will attempt to purchase vehicles for at or below the wholesale value, there are other fees beyond the wholesale value that will increase the dollar amount the dealership owns the vehicle for retail. Common expenses that a dealership can incur after purchasing a vehicle include transportation, reconditioning, detailing and certification. Transportation costs will vary wildly, but the average vehicle that requires interstate transport will cost at least $500 to move. Reconditioning costs will also vary by vehicle, as some vehicles will require no maintenance and others will require thousands of dollars' worth of work. Prior to a vehicle being offered for sale, most dealerships will also complete a thorough interior and exterior detail.

Trade-in value is what an individual should expect to receive for his/her vehicle if he/she decides to sell it to a dealer. The trade-in price is generally lower than the wholesale price since a dealer taking a car on trade-in has the option to either sell it at the retail price (to another end consumer) or at the wholesale price (to another dealer). Either way, the dealer expects to make a profit.

In some embodiments, trade-in pricing method 500 may comprise determining a wholesale price for a used vehicle (step 502). This can be accomplished using an embodiment of wholesale pricing method 300 described above. In trade-in and wholesale pricing, the condition of the vehicle plays an important role and must be considered. However, for trade-in pricing, there can be additional factors that may affect the price of a used vehicle. For example, the cost of moving a used vehicle from where it is to a lot of the dealership may be considered (step 504) as well as the cost of preparing the vehicle for resale (step 506) may affect the price of a used vehicle. The wholesale price plus these additional costs represent the bare minimum cost to the dealer which reflects the bottom line trade-in price that the dealer should consider offering for the used vehicle (step 508).

An example may help to illustrate these methods for generating wholesale and trade-in values. In this example, a customer has a vehicle which is a 2009 Mazda RX-8. The customer wants to determine the trade-in and wholesale prices for this vehicle. To determine the wholesale value, the vehicle data system first determines an anchor price for the vehicle. This anchor price is calculated by computing the retail sales price for the vehicle using the model described above. For the purposes of this example, a value of $12,700 will be assumed.

A bin average for similar vehicles is computed by the system. This is the average ratio of wholesale prices to predicted retail prices for all vehicles with the same trim sold in the last 12 weeks. For the purposes of this example, this value will be assumed to be 0.88. A vehicle-specific adjustment is then computed from the features of the to-be-priced vehicle. This is accomplished by applying the linear model shown in the following table:

TABLE 2

| Variable List | Example Value | Coefficient | Contribution |
|---|---|---|---|
| nrm_hh_med_income_lt_0_8 | 0 | | |
| trans_manual | 1 | −0.0005 | −0.0005 |
| eom_flag | 0 | | |
| bb_region2 | 0 | | |
| bb_region3 | 0 | | |
| bb_region4 | 0 | | |
| bb_region5 | 0 | | |
| bb_region6 | 0 | | |
| gr_invoice_avg | 0.05 | −0.007 | −0.00035 |
| mileage_ratio | 0.8 | −0.05 | −0.04 |
| log_dist_neutral | 5 | 0.001 | 0.005 |
| log_dist_neutral_hi | 0 | | |
| nrm_pct_units_urban | 0.85 | −0.003 | −0.00255 |
| | | Regression Sum = | −0.0384 |

The wholesale value can then be calculated as:

Estimated Wholesale=(Anchor Price)*(Bin Average+Regression Sum+Intercept)

Consequently, for the example values above, and using an value of 0.05 for the intercept:

$11,323=$12,700*(0.88−0.0384+0.05)

To continue the example, a trade-in value may also be determined. The trade-in price is based on the wholesale price and is adjusted to account for a dealer's costs that are necessary to realize that wholesale price (namely reconditioning costs, auction fees, transportation costs, and profit margin).

In this example, it might be found that no reconditioning would be necessary. The shipping cost from a dealer to the nearest auction center could be estimated, for example, to be $700. Auction fees might be $123. Finally, the dealer might expect to make $200 in profit. Thus, the trade-in price could be estimated as:

$11,323−$700−$123−$200=$10,300

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system for determining pricing information, the system comprising:
   a computer processor;
   a network interface coupled to the processor;
   a data storage device coupled to the processor, the data storage device storing a retail pricing model;
   an output device coupled to the processor;
   wherein the processor is configured to:
      collect, via the network interface, historical wholesale transaction records for a set of wholesale transaction for a set of vehicles from data sources external to the system and store the collected historical wholesale transactions on the data storage device, wherein each wholesale transaction includes a sale date, a sale price, a sale region, a vehicle identification and a set of vehicle attributes for a corresponding vehicle, the set of vehicle attributes for a corresponding vehicle comprising a vehicle year, make and model;
   provide, over a network, a set of user interface pages with controls to collect vehicle condition information for the vehicles in the set of vehicles, the vehicle condition information comprising first indicators for a plurality of conditions, the plurality of conditions comprising a title condition, a paint condition, a body condition and a windshield condition, and including free-form text;
   in a backend process:
      apply a first set of rules to bin vehicles in the set of vehicles into a plurality of bins based on make, model, year and region;
      extracting first indicators for the plurality of conditions from the free-form text by parsing the free-form text to determine one or more textual condition terms in the free-form text and transforming the one or more textual condition terms determined from the free-form text to first indicators for the plurality of conditions;
      classifying the first indicators into one of a set of clusters of second indicators representing the plurality of conditions, wherein the set of clusters is constructed utilizing a machine learning model trained to semantically analyze the free-form text using a training set correlating condition terms to the set of clusters;
      enhancing the historical transaction records with the second indicators for the plurality of conditions associated with each historical transaction record;
      map the second indicators for the plurality of conditions, to values for a set of condition features, wherein mapping the second indicators for the plurality conditions to values for the set of condition features comprises:
         assigning each vehicle in the set of vehicles a numerical value for each feature in the set of condition features;
      generate a price ratio model that models price ratio as a function of a set of variables that represent at least the set of vehicle attributes and the set of condition features for the vehicles in the vehicle set, the price ratio model comprising a set of regression coefficients applied to the set of variables, the set of regression coefficients based on a fit of the price ratio model to the historical wholesale transaction and set of condition features;

in a frontend process:
provide a web page to a user device, the web page having one or more input fields for a user to provide a user specified vehicle configuration;
receive, based on user interaction with the web page, a request for a wholesale price of a user specified target vehicle of interest from the user device, the request comprising a set of target vehicle attributes, condition information for the target vehicle and a geographical location, wherein the condition information for the target vehicle indicates conditions associated with the target vehicle and the target vehicle attributes include a target vehicle make, model and year;
determine a retail price for the target vehicle based on the retail pricing model;
apply a second set of rules to determine a bin for the target vehicle from the plurality of bins based on the target vehicle make, model and year and geographical location;
determine from a set of historical records containing wholesale transaction data, vehicles in the set of vehicles associated with the bin;
for each vehicle associated with the bin, determine a predicted retail price based on the retail pricing model;
determine an average ratio of wholesale price to predicted retail price for the bin;
determine a set of target vehicle condition features from the set of condition features based on the condition information for the target vehicle, the set of target vehicle condition features representing conditions associated with the target vehicle;
apply the price ratio model with the set of regression coefficients pre-calculated in the backend process to dynamically generate the wholesale price for the target vehicle of interest as a function of the retail price of the target vehicle, the average ratio of wholesale price to predicted retail price for the bin, the set of target vehicle attributes and the set of target vehicle features representing conditions associated with the target vehicle;
respond to the request in real-time by generating a response interface and providing the response interface to the user device, the response interface configured to reconfigure a user interface at the user device to present the dynamically generated wholesale price for the target vehicle of interest.

2. The system of claim 1, wherein the processor is configured to, in the frontend process:
set variables in the price ratio model for the corresponding ones of the target vehicle features to the associated numeric values when applying the price ratio model.

3. The system of claim 1, wherein the processor is further configured to:
collect wholesale sale transaction cost information from one or more data sources;
determine a trade-in value of the target vehicle based on the wholesale price and the wholesale sale transaction cost information; and
output the trade-in value to the user via the output device.

4. The system of claim 3, wherein the processor is configured to:
collect wholesale sale transaction cost information from a plurality of data sources that are associated with different auction locations;
determine wholesale sale transaction costs associated with the different auction locations;
determine separate trade-in values for each of the different auction locations; and
output the trade-in values for each of the different auction locations to the user via the output device.

5. The system of claim 1, wherein the processor is configured to:
retrieve the wholesale transactions from one or more wholesale auction databases.

6. The system of claim 1, wherein the processor is configured to provide the set of user interface pages to a user input device and wherein condition information input via the set of user interface pages is received by the processor and stored in the data storage device.

7. A method for determining pricing information, the method comprising:
collecting, by a server computer having a processor, a memory and storing a retail pricing model, historical wholesale transaction records for a set of wholesale transaction for a set of vehicles from data sources communicatively connected to the server computer, wherein each wholesale transaction includes a sale date, a sale price, a sale region, a vehicle identification a set of vehicle attributes for a corresponding vehicle, the set of vehicle attributes for a corresponding vehicle comprising a vehicle year, make and model;
storing, by the server computer, the collected historical wholesale transactions on a data storage device;
providing, by the server computer, a set of user interface pages with controls to collect vehicle condition information for the vehicles in the set of vehicles, the vehicle condition information comprising first indicators for a plurality of conditions, the plurality of conditions comprising a title condition, a paint condition, a body condition and a windshield condition;
implementing a backend process by the server computer, the backend process comprising:
applying a first set of rules to bin vehicles in the set of vehicles into a plurality of bins based on make, model, year and region;
extracting first indicators for the plurality of conditions from the free-form text by parsing the free-form text to determine one or more textual condition terms in the free-form text and transforming the one or more textual condition terms determined from the free-form text to first indicators for the plurality of conditions;
classifying the first indicators into one of a set of clusters of second indicators representing the plurality of conditions, wherein the set of clusters is constructed utilizing a machine learning model trained to semantically analyze the free-form text using a training set correlating condition terms to the set of clusters;
enhancing the historical transaction records with the second indicators for the plurality of conditions associated with each historical transaction record;
mapping the second indicators for the plurality of conditions to values for a set of condition features, wherein mapping the indicators for the plurality conditions to values for the set of condition features comprises assigning each vehicle in the set of vehicles a numerical value for each feature in the set of condition features;

generating a price ratio model that models price ratio as a function of a set of variables that represent at least the set of vehicle attributes and the set of condition features for the vehicles in the set of vehicles, the price ratio model comprising a set of regression coefficients applied to the set of variables, the set of regression coefficients based on a fit of the price ratio model to the historical wholesale transactions and set of condition features;

implementing a frontend process by the server computer, the frontend process comprising:

providing a web page to a user device, the web page having one or more input fields for a user to provide a user specified vehicle configuration;

receiving, by the server computer, a request based on user interaction with the web page for a wholesale price of a user-specified target vehicle of interest, the request comprising a set of target vehicle attributes, condition information for the target vehicle and a geographical location, wherein the condition information for the target vehicle indicates conditions associated with the target vehicle and the target vehicle attributes include a target vehicle make, model and year;

determining by the server computer, a retail price for the target vehicle based on the retail pricing model;

applying a second set of rules to determine a bin for the target vehicle from the plurality of bins based on the target vehicle make, model and year and geographical location;

determining from a set of historical records containing wholesale transaction data, vehicles from the set of vehicles associated with the bin;

for each vehicle associated with the bin, determining a predicted retail price based on the retail pricing model;

determining an average ratio of wholesale price to predicted retail price for the bin;

determining a set of target vehicle features from the set of condition features, the set of target vehicle features corresponding to the condition information and representing conditions associated with the target vehicle;

applying the price ratio model using the set of regression coefficients pre-calculated in the backend process to dynamically generate a wholesale price for the target vehicle of interest as a function of the retail price of the target vehicle, the average ratio of wholesale price to retail price for the bin, the set of target vehicle attributes and the set of target vehicle features representing conditions associated with the target vehicle;

responding to the request in real-time by generating a response interface and providing the response interface to the user device, the response interface configured to reconfigure a user interface at the user device to present the dynamically generated wholesale price for the target vehicle of interest.

8. The method according to claim 7, further comprising:
setting variables in the price ratio model for the corresponding ones of the target vehicle features to the associated numeric values when applying the price ratio model.

9. The method according to claim 7, further comprising:
collecting wholesale sale transaction cost information from one or more data sources'
determining a trade-in value of the target vehicle based on the wholesale price and the wholesale sale transaction cost information; and
outputting the trade-in value to the user via the response interface.

10. The method according to claim 9, further comprising:
collecting wholesale sale transaction cost information from a plurality of data sources that are associated with different auction locations;
determining wholesale sale transaction costs associated with the different auction locations;
determining separate trade-in values for each of the different auction locations; and
outputting the trade-in values for each of the different auction locations to the user via the response interface.

11. The method according to claim 7, further comprising:
retrieving the historical wholesale transactions from one or more wholesale auction databases.

12. The method according to claim 7, further comprising:
providing to a user input device the set of user interface pages, wherein condition information input via the set of user interface pages is stored in the data storage device.

13. A computer program product comprising at least one non-transitory computer-readable storage medium storing computer instructions that are translatable by a server computer to perform:

implementing by the server computer that stores a retail pricing model, a backend process comprising:

collecting historical wholesale transaction records for a set of wholesale transaction for a set of vehicles from data sources communicatively connected to the server computer, wherein each wholesale transaction includes a sale date, a sale price, a sale region, a vehicle identification a set of vehicle attributes for a corresponding vehicle, the set of vehicle attributes for a corresponding vehicle comprising a vehicle year, make and model;

storing the collected historical wholesale transactions on a data storage device;

providing, by the server computer, a set of user interface pages with controls to collect vehicle condition information for the vehicles in the set of vehicles, the vehicle condition information comprising first indicators for a plurality of conditions, the plurality of conditions comprising a title condition, a paint condition, a body condition and a windshield condition;

applying a first set of rules to bin vehicles in the set of vehicles into a plurality of bins based on make, model, year and region;

extracting first indicators for the plurality of conditions from the free-form text by parsing the free-form text to determine one or more textual condition terms in the free-form text and transforming the one or more textual condition terms determined from the free-form text to first indicators for the plurality of conditions;

classifying the first indicators into one of a set of clusters of second indicators representing the plurality of conditions, wherein the set of clusters is constructed utilizing a machine learning model trained to semantically analyze the free-form text using a training set correlating condition terms to the set of clusters;

enhancing the historical transaction records with the second indicators for the plurality of conditions associated with each historical transaction record;

mapping the second indicators for the plurality of conditions, including the indicators determined from the free-form text, to values for a set of condition features, wherein mapping the second indicators for the plurality conditions to values for the set of condition features comprises assigning each vehicle in the set of vehicles a numerical value for each condition feature in the set of condition features;

generating a price ratio model that models price ratio as a function of a set of variables that represent at least the set of vehicle attributes and the set of condition features and the price ratio model comprising a set of regression coefficients applied to the set of variables, the set of regression coefficients based on a fit of the price ratio model to the historical wholesale transactions and set of condition features;

implementing a frontend process by the server computer, the frontend process comprising:

providing a web page to a user device, the web page having one or more input fields for a user to provide a user specified vehicle configuration;

receiving, by the server computer, a request based on user interaction with the web page for a wholesale price of a user-specified target vehicle of interest, the request comprising a set of target vehicle attributes, condition information for the target vehicle and a geographical location, wherein the condition information for the target vehicle indicates conditions associated with the target vehicle and the target vehicle attributes include a target vehicle make, model and year;

applying a second set of rules to determine a bin for the target vehicle from the plurality of bins based on the target vehicle make, model and year and geographical location;

determining from a set of historical records containing wholesale transaction data for vehicles in the set of vehicles, vehicles from the set of vehicles associated with the bin;

for each vehicle associated with the bin, determining a predicted retail price based on the retail pricing model;

determining an average ratio of wholesale price to predicted retail price for the bin;

determining a retail price for target vehicle of interest based on the retail pricing model;

determining a set of target vehicle features from the set of condition features, the set of target vehicle features corresponding to the condition information for the target vehicle and representing conditions associated with the target vehicle;

applying the price ratio model using the set of regression coefficients pre-calculated in the backend process to dynamically generate the wholesale price for the target vehicle as a function of the retail price of the target vehicle, the average ratio of wholesale price to retail price for the bin, the set of target vehicle attributes and the set of target vehicle features representing conditions associated with the target vehicle; and responding to the request in real-time by generating a response interface and providing the response interface to the user device, the response interface configured to reconfigure a user interface at the user device to present the dynamically generated wholesale price for the target vehicle of interest.

14. The computer program product of claim 13, wherein the computer instructions are further translatable by the server computer to perform:

setting variables in the price ratio model for the corresponding ones of the target vehicle features to the associated numeric values when applying the price ratio model.

15. The computer program product of claim 13, wherein the computer instructions are further translatable by the server computer to perform:

collecting wholesale sale transaction cost information from one or more data sources;

determining a trade-in value of the target vehicle based on the wholesale price and the wholesale sale transaction cost information; and outputting the trade-in value to the user via the response interface.

16. The computer program product of claim 15, wherein the computer instructions are further translatable by the server computer to perform:

collecting wholesale sale transaction cost information from a plurality of data sources that are associated with different auction locations;

determining wholesale sale transaction costs associated with the different auction locations;

determining separate trade-in values for each of the different auction locations; and outputting the trade-in values for each of the different auction locations to the user via the response interface.

17. The computer program product of claim 13, wherein the computer instructions are further translatable by the server computer to perform:

providing to a user input device the set of user interface pages, wherein condition information input via the set of user interface pages is stored in the data storage device.

* * * * *